United States Patent
Raghavan et al.

(10) Patent No.: US 12,040,860 B2
(45) Date of Patent: Jul. 16, 2024

(54) TECHNIQUES FOR ANTENNA SUBSET SELECTION IN UPPER MILLIMETER WAVE BANDS

(71) Applicant: QUALCOMM Incorporated, San Diego, CA (US)

(72) Inventors: Vasanthan Raghavan, West Windsor Township, NJ (US); Jeremy Darren Dunworth, La Jolla, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 17/118,510

(22) Filed: Dec. 10, 2020

(65) Prior Publication Data

US 2021/0226681 A1    Jul. 22, 2021

Related U.S. Application Data

(60) Provisional application No. 62/963,748, filed on Jan. 21, 2020.

(51) Int. Cl.
*H04B 7/06* (2006.01)
*H04B 1/00* (2006.01)
(Continued)

(52) U.S. Cl.
CPC ......... *H04B 7/0617* (2013.01); *H04B 1/0064* (2013.01); *H04B 7/0404* (2013.01); *H04B 7/0413* (2013.01); *H04W 72/0453* (2013.01)

(58) Field of Classification Search
None
See application file for complete search history.

(56) References Cited

U.S. PATENT DOCUMENTS

| 10,097,252 B2 | 10/2018 | Jo et al. |
| 10,588,089 B1 | 3/2020 | Raghavan et al. |

(Continued)

FOREIGN PATENT DOCUMENTS

| CN | 106559114 A | 4/2017 |
| EP | 3425808 A1 | 1/2019 |

(Continued)

OTHER PUBLICATIONS

International Search Report and Written Opinion—PCT/US2021/064617—ISA/EPO—dated Jun. 28, 2021.

(Continued)

*Primary Examiner* — Srinivasa R Reddivalam
(74) *Attorney, Agent, or Firm* — Holland & Hart LLP

(57) ABSTRACT

Methods, systems, and devices for wireless communications are described. A wireless device may dynamically select subsets of antenna elements within an array based on power consumption and link performance and/or a configuration of components at the wireless device. For example, a wireless device may identify an antenna array having multiple antenna elements, and the wireless device may select respective subsets of antenna elements (e.g., subarrays) for uplink and downlink transmissions. In such cases, the selection may be based on a tradeoff of power consumption at the device and link performance. Additionally or alternatively, the selection may be based on a configuration and/or constraints on a number of radio frequency (RF) components of the wireless device. The wireless device may communicate based on the dynamic selection of different subsets of antenna elements of an array for uplink and downlink communications.

29 Claims, 20 Drawing Sheets

(51) Int. Cl.
  *H04B 7/0404* (2017.01)
  *H04B 7/0413* (2017.01)
  *H04W 72/0453* (2023.01)

(56) References Cited

U.S. PATENT DOCUMENTS

| | | | |
|---|---|---|---|
| 11,101,849 B2 | 8/2021 | Raghavan et al. | |
| 2010/0279625 A1 | 11/2010 | Ko et al. | |
| 2012/0275531 A1* | 11/2012 | Wu | H04B 7/0689 |
| | | | 375/267 |
| 2013/0315321 A1 | 11/2013 | Rajagopal et al. | |
| 2015/0230102 A1 | 8/2015 | Kang et al. | |
| 2016/0021548 A1* | 1/2016 | Raghavan | H04B 7/046 |
| | | | 370/329 |
| 2016/0065290 A1 | 3/2016 | Zhu et al. | |
| 2016/0204507 A1 | 7/2016 | Karjalainen | |
| 2016/0302146 A1 | 10/2016 | Rangan et al. | |
| 2016/0373223 A1 | 12/2016 | Quick, Jr. | |
| 2017/0026094 A1 | 1/2017 | Milleth et al. | |
| 2018/0063693 A1 | 3/2018 | Chakraborty et al. | |
| 2018/0145742 A1* | 5/2018 | Li | H04B 7/0874 |
| 2018/0278320 A1 | 9/2018 | Chendamarai Kannan et al. | |
| 2019/0007121 A1 | 1/2019 | Zhinong et al. | |
| 2019/0020402 A1 | 1/2019 | Gharavi et al. | |
| 2019/0044600 A1 | 2/2019 | Milleth et al. | |
| 2019/0150003 A1 | 5/2019 | He et al. | |
| 2019/0199457 A1 | 6/2019 | Chopra et al. | |
| 2019/0199492 A1 | 6/2019 | Na et al. | |
| 2019/0230606 A1* | 7/2019 | Ryu | H04W 52/367 |
| 2019/0288760 A1 | 9/2019 | Li et al. | |
| 2020/0021349 A1 | 1/2020 | Chapman et al. | |
| 2020/0107341 A1 | 4/2020 | Zhang et al. | |
| 2020/0136704 A1* | 4/2020 | Liu | H04B 7/0469 |
| 2020/0145159 A1* | 5/2020 | Tsai | H04L 5/0051 |
| 2020/0169312 A1 | 5/2020 | Black et al. | |
| 2020/0205012 A1* | 6/2020 | Bengtsson | H04B 7/0413 |
| 2020/0304218 A1 | 9/2020 | Gao et al. | |
| 2021/0091974 A1 | 3/2021 | Elliott et al. | |
| 2021/0136598 A1 | 5/2021 | Raghavan et al. | |
| 2021/0194515 A1* | 6/2021 | Go | H04B 1/401 |
| 2022/0376767 A1 | 11/2022 | Nilsson et al. | |

FOREIGN PATENT DOCUMENTS

| | | |
|---|---|---|
| WO | WO-2015183472 A1 | 12/2015 |
| WO | WO-2018129300 A1 | 7/2018 |
| WO | 2019147471 A1 | 8/2019 |
| WO | 2019158207 A1 | 8/2019 |
| WO | 2019217004 A1 | 11/2019 |
| WO | WO-2020005294 A1 | 1/2020 |

OTHER PUBLICATIONS

Partial International Search Report—PCT/US2020/064617—ISA/EPO—dated Mar. 29, 2021.

* cited by examiner

TECHNIQUES FOR ANTENNA SUBSET SELECTION IN UPPER MILLIMETER WAVE BANDS

CROSS REFERENCE

The present Application for Patent claims the benefit of U.S. Provisional Patent Application No. 62/963,748 by RAGHAVAN et al., entitled "TECHNIQUES FOR ANTENNA SUBSET SELECTION IN UPPER MILLIMETER WAVE BANDS," filed Jan. 21, 2020, assigned to the assignee hereof, and expressly incorporated by reference herein.

FIELD OF TECHNOLOGY

The following relates generally to wireless communications and more specifically to techniques for antenna subset selection in upper millimeter wave bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some systems may support wireless communications at various carrier frequencies in different frequency ranges, such as frequencies less than 6 gigahertz (GHz) or frequencies greater than 52.6 GHz. Because wavelength decreases for communications at higher radio frequency (RF) spectrum bands, devices may be configured with antenna arrays that support communications over these bands, which may include antenna arrays having a greater number of antenna elements (e.g., as compared to arrays configured for communications at relatively lower RF spectrum bands). However, in some cases, a greater number of antenna elements in a device may introduce additional complexity associated with the supporting circuitry and operation. Moreover, increasing the number of antenna elements in a wireless device (such as a mobile device having size and/or battery constraints) may require additional considerations for power consumption, thermal management, form factor design, or the like.

SUMMARY

The described techniques relate to improved methods, systems, devices, and apparatuses that support techniques for antenna subset selection in upper millimeter wave (mmW) bands. Generally, the described techniques provide for dynamic selection of subsets of antenna elements within an array at a wireless device, which may be based on power consumption and link performance, or may be based on a configuration of components at the wireless device. For example, a wireless device may identify an antenna array having multiple antenna elements, and the wireless device may select respective subsets of antenna elements (e.g., subarrays) for uplink and downlink transmissions. In such cases, the selection may be based on a tradeoff of power consumption at the device (e.g., where more antenna elements in use may consume relatively more power) and link performance (e.g., where fewer antenna elements in use may limit some link performance). Additionally or alternatively, the selection may be based on a configuration of radio frequency (RF) components of the wireless device. In particular, the wireless device may have a limited number of RF components (e.g., low-noise amplifiers (LNAs) and/or power amplifiers (PAs)), and the wireless device may select antenna subarrays based on the capabilities and configuration of the available RF components. In any case, the wireless device may communicate based on the selection of different subsets of antenna elements of an array.

The dynamic selection of different subsets of antenna elements may enable the wireless device to efficiently communicate in RF spectrum bands (e.g., upper mmW bands, such as bands greater than 52.6 gigahertz (GHz)), while also efficiently managing battery performance and power consumption, thermal output, link quality, or the like. In some examples, the wireless device may modify the number of antenna elements used through the selection of the respective subarrays, and transmit, to another device (e.g., a base station) an indication of a change in the number of antenna elements (or the size of the array used for uplink and/or downlink communications). As such, the other device may adjust one or more communication parameters to account for the modification of the number of antenna elements. In addition, the selection of the subsets of antenna elements may not change a direction of over which directional communications is established with the other device. As a result, an established quasi co-location (QCL) configuration for signals transmitted over a communication link between the devices may remain unchanged.

A method of wireless communication at a first wireless device is described. The method may include identifying an antenna array including a set of antenna elements, the antenna array used for communicating over a link with a second wireless device, selecting, from the set of antenna elements, a first subset of antenna elements for uplink transmissions and a second subset of antenna elements for downlink transmissions, the selection being based on one or more operational parameters associated with power and link performance, where a QCL configuration for signals transmitted over the link is unchanged after the selection, and communicating over the link with the second wireless device based on the selected first subset of antenna elements and the second subset of antenna elements.

An apparatus for wireless communication at a first wireless device is described. The apparatus may include a processor, memory coupled with the processor, and instructions stored in the memory. The instructions may be executable by the processor to cause the apparatus to identify an antenna array including a set of antenna elements, the antenna array used for communicating over a link with a second wireless device, select, from the set of antenna elements, a first subset of antenna elements for uplink transmissions and a second subset of antenna elements for downlink transmissions, the selection being based on one or more operational parameters associated with power and link performance, where a QCL configuration for signals transmitted over the link is unchanged after the selection, and communicate over the link with the second wireless device based on the selected first subset of antenna elements and the second subset of antenna elements.

Another apparatus for wireless communication at a first wireless device is described. The apparatus may include means for identifying an antenna array including a set of antenna elements, the antenna array used for communicating over a link with a second wireless device, selecting, from the set of antenna elements, a first subset of antenna elements for uplink transmissions and a second subset of antenna elements for downlink transmissions, the selection being based on one or more operational parameters associated with power and link performance, where a QCL configuration for signals transmitted over the link is unchanged after the selection, and communicating over the link with the second wireless device based on the selected first subset of antenna elements and the second subset of antenna elements.

A non-transitory computer-readable medium storing code for wireless communication at a first wireless device is described. The code may include instructions executable by a processor to identify an antenna array including a set of antenna elements, the antenna array used for communicating over a link with a second wireless device, select, from the set of antenna elements, a first subset of antenna elements for uplink transmissions and a second subset of antenna elements for downlink transmissions, the selection being based on one or more operational parameters associated with power and link performance, where a QCL configuration for signals transmitted over the link is unchanged after the selection, and communicate over the link with the second wireless device based on the selected first subset of antenna elements and the second subset of antenna elements.

Some examples of the method, apparatuses, and non-transitory computer-readable medium described herein may further include operations, features, means, or instructions for transmitting, to the second wireless device, an indication that a number of antenna elements used by the first wireless device may have changed based on the selected first subset of antenna elements and the second subset of antenna elements.

Some examples of the method, apparatuses, and non-transitory computer-readable medium described herein may further include operations, features, means, or instructions for receiving, from the second wireless device, a transmission having an adjusted transmission power, adjusted transmission rate, or a combination thereof, based on the transmitted indication that the number of antenna elements used by the first wireless device may have changed.

In some examples of the method, apparatuses, and non-transitory computer-readable medium described herein, selecting the first subset of antenna elements and the second subset of antenna elements may include operations, features, means, or instructions for identifying a first number of antenna elements from the set of antenna elements for communicating with the second wireless device during a first time interval, and selecting a second number of antenna elements that may be less than the first number of antenna elements, where the second number of antenna elements may be used for communicating over the link with the second wireless device during a second time interval.

Some examples of the method, apparatuses, and non-transitory computer-readable medium described herein may further include operations, features, means, or instructions for selecting a third number of antenna elements that may be less than the second number of antenna elements, and communicating over the link with the second wireless device during a third time interval using the third number of antenna elements.

In some examples of the method, apparatuses, and non-transitory computer-readable medium described herein, the third number of antenna elements form a planar array pattern, a linear array pattern, or a combination thereof. In some examples of the method, apparatuses, and non-transitory computer-readable medium described herein, the first time interval and the second time interval each include one or more symbols, one or more slots, one or more subframes, or a combination thereof.

In some examples of the method, apparatuses, and non-transitory computer-readable medium described herein, the one or more operational parameters include a power consumption level at the first wireless device, a thermal overhead level of the first wireless device, a communication rate threshold, a transmission reliability threshold, or a combination thereof. In some examples of the method, apparatuses, and non-transitory computer-readable medium described herein, the first wireless device includes a UE, a customer premises equipment, a relay node, a smart repeater with a decode and forward capability, a dumb repeater with an amplify and forward capability, a router, an integrated access and backhaul (IAB) node, or a combination thereof.

In some examples of the method, apparatuses, and non-transitory computer-readable medium described herein, the second wireless device includes a base station, a backhaul node, an IAB node, or a combination thereof. In some examples of the method, apparatuses, and non-transitory computer-readable medium described herein, the antenna array may be configured to operate at carrier frequencies greater than 52.6 GHz.

A method of wireless communication at a first wireless device is described. The method may include identifying an antenna array and a configuration of one or more RF components associated with the antenna array, the antenna array including a set of antenna elements, selecting, from the set of antenna elements, a first subset of antenna elements for uplink transmissions and a second subset of antenna elements for downlink transmissions, the selection being based on the configuration of the one or more RF components, and communicating over a link with a second wireless device based on the selected first subset of antenna elements and the second subset of antenna elements.

An apparatus for wireless communication at a first wireless device is described. The apparatus may include a processor, memory coupled with the processor, and instructions stored in the memory. The instructions may be executable by the processor to cause the apparatus to identify an antenna array and a configuration of one or more RF components associated with the antenna array, the antenna array including a set of antenna elements, select, from the set of antenna elements, a first subset of antenna elements for uplink transmissions and a second subset of antenna elements for downlink transmissions, the selection being based on the configuration of the one or more RF components, and communicate over a link with a second wireless device based on the selected first subset of antenna elements and the second subset of antenna elements.

Another apparatus for wireless communication at a first wireless device is described. The apparatus may include means for identifying an antenna array and a configuration of one or more RF components associated with the antenna array, the antenna array including a set of antenna elements, selecting, from the set of antenna elements, a first subset of antenna elements for uplink transmissions and a second subset of antenna elements for downlink transmissions, the selection being based on the configuration of the one or more RF components, and communicating over a link with a second wireless device based on the selected first subset of antenna elements and the second subset of antenna elements.

A non-transitory computer-readable medium storing code for wireless communication at a first wireless device is described. The code may include instructions executable by a processor to identify an antenna array and a configuration of one or more RF components associated with the antenna array, the antenna array including a set of antenna elements, select, from the set of antenna elements, a first subset of antenna elements for uplink transmissions and a second subset of antenna elements for downlink transmissions, the selection being based on the configuration of the one or more RF components, and communicate over a link with a second wireless device based on the selected first subset of antenna elements and the second subset of antenna elements.

In some examples of the method, apparatuses, and non-transitory computer-readable medium described herein, identifying the configuration of the one or more RF components associated with the antenna array may include operations, features, means, or instructions for identifying a set of one or more PAs at the first wireless device, where selecting the first subset of antenna elements for uplink transmissions may be based on the identified set of one or more PAs, and identifying a set of one or more LNAs at the first wireless device, where selecting the second subset of antenna elements for downlink transmission may be based on the identified set of one or more LNAs.

In some examples of the method, apparatuses, and non-transitory computer-readable medium described herein, a first PA of the set of one or more PAs may be configured to operate with a first range of RF spectrum bands, a second PA of the set of one or more PAs may be configured to operate in a second range of RF spectrum bands different from the first range, and an LNA of the set of one or more LNAs may be configured to operate in a third range of RF spectrum bands that includes at least the first range and the second range.

Some examples of the method, apparatuses, and non-transitory computer-readable medium described herein may further include operations, features, means, or instructions for receiving, from the second wireless device, an indication of a number of antenna elements to use for communicating over the link based on antenna elements used at the second wireless device, where selecting the first subset of antenna elements and the second subset of antenna elements may be based on the received indication.

Some examples of the method, apparatuses, and non-transitory computer-readable medium described herein may further include operations, features, means, or instructions for selecting the first subset of antenna elements and the second subset of antenna elements based on an equivalent isotropic radiated power threshold, an effective isotropic sensitivity threshold, or a combination thereof.

Some examples of the method, apparatuses, and non-transitory computer-readable medium described herein may further include operations, features, means, or instructions for selecting the first subset of antenna elements and the second subset of antenna elements based on a RF spectrum bandwidth supported by each of the one or more RF components. In some examples of the method, apparatuses, and non-transitory computer-readable medium described herein, the first subset of antennas may be different from the second subset of antenna elements.

In some examples of the method, apparatuses, and non-transitory computer-readable medium described herein, the configuration of the one or more RF components includes a quantity of PAs and a quantity of LNAs. In some examples of the method, apparatuses, and non-transitory computer-readable medium described herein, the first wireless device includes a UE, a customer premises equipment, a relay node, a smart repeater with a decode and forward capability, a dumb repeater with an amplify and forward capability, a router, an IAB node, or a combination thereof.

In some examples of the method, apparatuses, and non-transitory computer-readable medium described herein, the second wireless device includes a base station, a backhaul node, an IAB node, or a combination thereof. In some examples of the method, apparatuses, and non-transitory computer-readable medium described herein, the antenna array may be configured to operate at carrier frequencies greater than 52.6 GHz.

A method of wireless communication at a first wireless device is described. The method may include communicating over a link with a second wireless device, receiving, from the second wireless device, an indication that a number of antenna elements used by the second wireless device has changed based on the second wireless device selecting a first subset of antenna elements for uplink transmissions and a second subset of antenna elements for downlink transmissions, where a QCL configuration for transmitting signals over the link remains unchanged after the selection, adjusting a transmission power, a transmission rate, or a combination thereof, based on the received indication that the number of antenna elements used by the second wireless device has changed, and communicating over the link with the second wireless device using the adjusted transmission power, the adjusted transmission rate, or a combination thereof, based on the received indication that the number of antenna elements used by the second wireless device has changed.

An apparatus for wireless communication at a first wireless device is described. The apparatus may include a processor, memory coupled with the processor, and instructions stored in the memory. The instructions may be executable by the processor to cause the apparatus to communicate over a link with a second wireless device, receive, from the second wireless device, an indication that a number of antenna elements used by the second wireless device has changed based on the second wireless device selecting a first subset of antenna elements for uplink transmissions and a second subset of antenna elements for downlink transmissions, where a QCL configuration for transmitting signals over the link remains unchanged after the selection, adjust a transmission power, a transmission rate, or a combination thereof, based on the received indication that the number of antenna elements used by the second wireless device has changed, and communicate over the link with the second wireless device using the adjusted transmission power, the adjusted transmission rate, or a combination thereof, based on the received indication that the number of antenna elements used by the second wireless device has changed.

Another apparatus for wireless communication at a first wireless device is described. The apparatus may include means for communicating over a link with a second wireless device, receiving, from the second wireless device, an indication that a number of antenna elements used by the second wireless device has changed based on the second wireless device selecting a first subset of antenna elements for uplink transmissions and a second subset of antenna elements for downlink transmissions, where a QCL configuration for transmitting signals over the link remains unchanged after the selection, adjusting a transmission power, a transmission rate, or a combination thereof, based on the received indication that the number of antenna elements used by the second wireless device has changed, and communicating over the link with the second wireless device using the adjusted transmission power, the adjusted transmission rate, or a combination thereof, based on the received indication that the number of antenna elements used by the second wireless device has changed.

A non-transitory computer-readable medium storing code for wireless communication at a first wireless device is described. The code may include instructions executable by a processor to communicate over a link with a second wireless device, receive, from the second wireless device, an indication that a number of antenna elements used by the second wireless device has changed based on the second wireless device selecting a first subset of antenna elements for uplink transmissions and a second subset of antenna elements for downlink transmissions, where a QCL configuration for transmitting signals over the link remains unchanged after the selection, adjust a transmission power, a transmission rate, or a combination thereof, based on the received indication that the number of antenna elements used by the second wireless device has changed, and communicate over the link with the second wireless device using the adjusted transmission power, the adjusted transmission rate, or a combination thereof, based on the received indication that the number of antenna elements used by the second wireless device has changed.

In some examples of the method, apparatuses, and non-transitory computer-readable medium described herein, the one or more operational parameters include a power consumption level at the first wireless device, a thermal overhead level of the first wireless device, a communication rate threshold, a transmission reliability threshold, or a combination thereof. In some examples of the method, apparatuses, and non-transitory computer-readable medium described herein, the first wireless device includes a UE, a customer premises equipment, a relay node, a smart repeater with a decode and forward capability, a dumb repeater with an amplify and forward capability, a router, an IAB node, or a combination thereof.

In some examples of the method, apparatuses, and non-transitory computer-readable medium described herein, the second wireless device includes a base station, a backhaul node, an IAB node, or a combination thereof. In some examples of the method, apparatuses, and non-transitory computer-readable medium described herein, the number of antenna elements may be configured to operate at carrier frequencies greater than 52.6 GHz.

DETAILED DESCRIPTION

Figure 1:
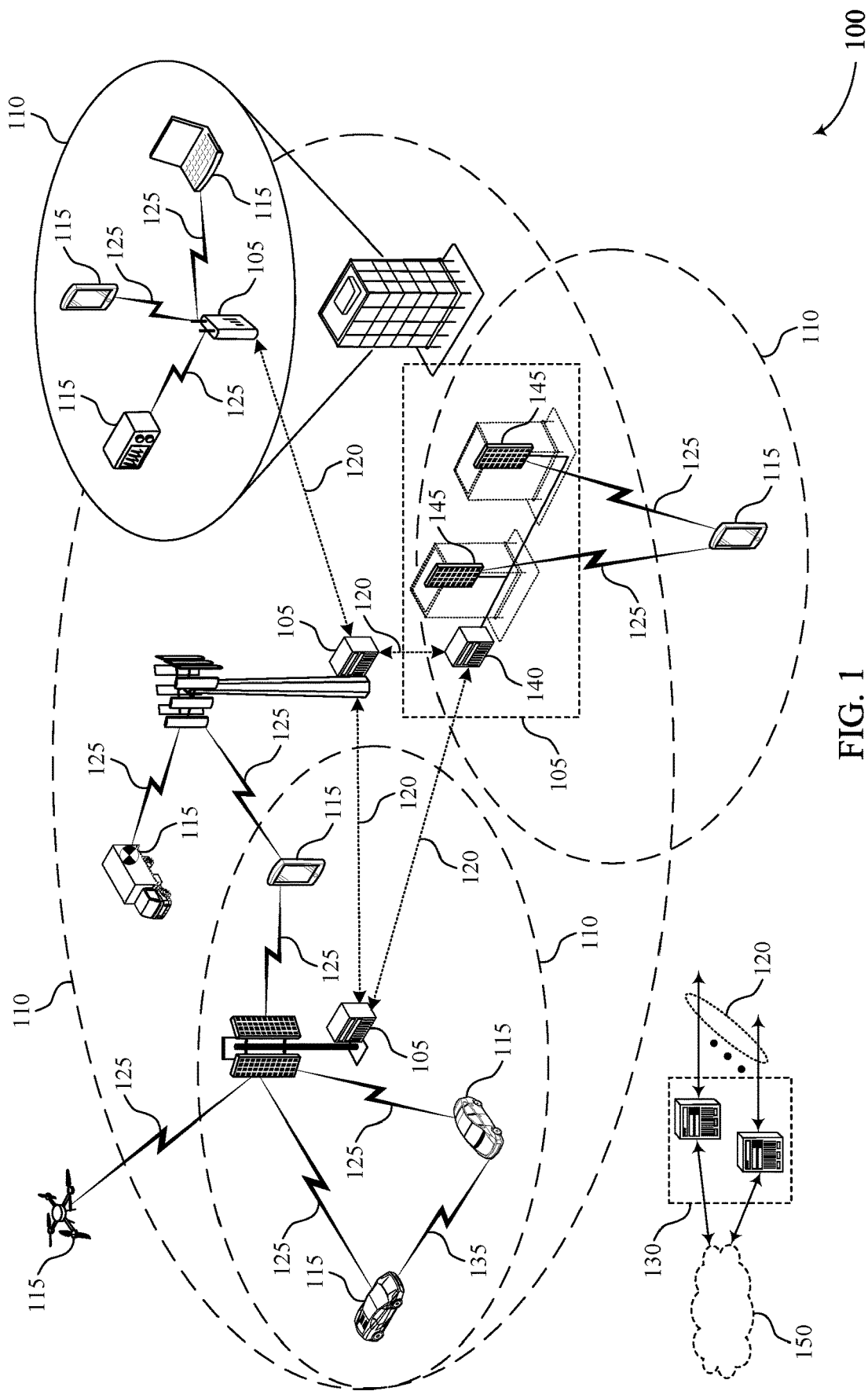
FIG. 1 illustrates an example of a system for wireless communications that supports techniques for antenna subset selection in upper millimeter wave (mmW) bands in accordance with aspects of the present disclosure.

Wireless communications may be designed to operate in various radio frequency (RF) spectrum bands, where some sets of bands may be designated as being included within a particular frequency range (FR) or frequency regime. For example, carrier frequencies less than 6 gigahertz (GHz) may be characterized as being within FR1 (which may also be referred to as sub-6 frequencies), carrier frequencies between 24 GHz and 52.6 may be within FR2, carrier frequencies between 7.125 and 25 GHz may be within FR3, and carrier frequencies between 52.6 and 114.25 GHz may be characterized within FR4. Further, as systems support wireless communications in higher frequency ranges (e.g., FR4), which may also be referred to as upper-millimeter wave (mmW) RF spectrum bands, the wavelength of wireless signals transmitted between devices may also decrease. The decreased wavelength may result in wireless devices include antenna arrays having a greater number of antenna elements each having a reduced size (e.g., where an array configured for FR4 may correspond to a physical area that is less than or equal to the area of an array configured for communications at lower carrier frequencies, such as in FR1, FR2, and FR3).

However, a greater number antenna elements may lead to challenges due to the need for supporting or associated circuitry for controlling such antenna elements and the aspects of the wireless device. For example, a form-factor of a wireless device (e.g., a user equipment (UE) such as a mobile phone) may be constrained (as compared to larger devices, such as a laptop computer), and chip area used for multiple radio frequency integrated circuits (RFICs) to control different antenna array elements may likewise be limited. Here, the number of RFICs and other components may also be limited by complexity, cost, specific fabrication techniques, and so forth. In another example, because a mobile device may generally be power-limited (e.g., operating on a battery), a greater number of components may also affect power consumption by the device. In particular, for an array that includes an increased number of antenna elements, a number of associated power amplifiers (PAs) and low-noise amplifiers (LNAs) at a device may be limited by, for example, power and thermal constraints. Thus, an increased number of antenna elements within an array, such as an array configured for communications in FR4, may be associated with a limited amount of supporting circuitry that is functionally available. As a result, it may be desirable to utilize techniques that enable efficient operations at a device when communicating with a greater number of antenna elements, while also maintaining minimal complexity of the device (e.g., through fewer RF components) and enabling the device to dynamically use less than a full antenna array (e.g., to save power).

The techniques described herein relate to the selection of antenna subarrays (e.g., subsets of antenna array elements) that enable a device to communicate in upper mmW RF spectrum bands while efficiently managing power and/or link budget constraints. The described techniques also address considerations for constraints on the number of components included in a device. The aspects described herein may realize one or more advantages for wireless communications, including, for example, the reduction of power consumption at a wireless device.

In one example, a wireless device (e.g., a UE) may establish a link with another wireless device (e.g., a base station), where the UE may be equipped with a set of antenna array elements that support wireless communications in FR4. The UE may identify one or more operational parameters (such as power consumption and link performance, or a tradeoff between these or other parameters) and may autonomously and dynamically determine to use different subsets of antenna array elements for uplink and/or downlink communications with the base station. As such, the UE may use less than all of the antenna array elements in the array for either uplink or downlink communications, thereby saving power. The selection of subarrays at the UE may not change a direction over which directional communications are established with another wireless device, and the selection may likewise not affect a quasi co-location (QCL) configuration for the established communication link. For instance, the base station may not need to modify a QCL mapping/indication based on the selected subsets of antenna elements. However, the UE may signal a change in array size, which may enable the base station to modify one or more transmission parameters (e.g., transmission power or transmission rate).

Further, the UE may adjust the number of antenna elements used while communicating with the base station from one time period to the next (e.g., from one slot to another, later slot). Through the dynamic selection of subarrays for communications, the UE may coherently manage its power consumption and link performance while communicating. In such cases, the selection of subsets of antenna elements may be based on the payload of a data transmission (e.g., a type of data, a priority of data, an amount of data), or may be based on a status of a communication (e.g., how much of data transmission/reception is completed). In other aspects, switching an antenna array size may also be based on power (e.g., battery) consumption of the device or thermal management (where fewer antenna elements may be used to conserve power and/or reduce thermal output).

Additionally or alternatively, the UE may select different subsets of antenna elements based on a configuration of its hardware of RF components. For instance, to minimize design and operational complexity, a UE may be configured with a number of LNAs (e.g., a single LNA) that is configured for downlink reception across a wide bandwidth (e.g., between 57 and 71 GHz), while also being equipped with a number of PAs (e.g., two PAs) for uplink transmission, where each PA is configured for transmission in different (e.g., narrow) frequency ranges than the LNA. For example, a first PA of the two PAs may support a frequency range of 57-64 GHz and a second PA of the two PAs may support a frequency range of 64-71 GHz. Accordingly, the UE may be equipped with a limited number of LNAs and PAs while efficiently communicating in higher carrier frequencies. In such examples, the selection of the subsets of antenna elements may be based on and correspond to the available PAs and LNAs at the UE, where the selection may take advantage of the operational efficiencies of the respective RF components. Thus, antenna subarray selection for a limited number of RF components may enable power savings in a device, despite a greater number of antenna elements (e.g., for communications in higher frequencies and associated with smaller wavelengths).

Aspects of the disclosure are initially described in the context of wireless communications systems. Further examples are then provided that illustrate antenna subarray selection as well as diagrams of RFICs that support autonomous selection of antenna arrays for uplink and downlink communications. Aspects of the disclosure are further illustrated by and described with reference to apparatus diagrams, system diagrams, and flowcharts that relate to techniques for antenna subset selection in upper mmW bands.

FIG. 1 illustrates an example of a wireless communications system 100 that supports techniques for antenna subset selection in upper mmW bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a wireless device, a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. A base station 105 may also be an example of a backhaul node, an integrated access and backhaul (IAB) node, or other device.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. A UE 115 may be an example of a customer premises equipment (CPE), a router, a repeater (e.g., a smart repeater with a decode and forward capability, a dumb repeater with an amplify and forward capability), a node (such as an IAB node), or other device.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

In some cases, wireless communications system 100 may support operations in various mmW bands, which may include upper mmW bands (e.g., RF spectrum bands greater than 52.6 GHz), which may also be known as FR4. However, because a wavelength (λ) at upper mmW bands is smaller than λ at other mmW bands (e.g., FR2 including 28 or 39 GHz), more antenna elements may be packed in the same physical aperture in FR4 than at FR2, resulting in relatively larger numbers of antenna elements for FR4 communications. In some examples, such as for beamforming performance, such antenna arrays may be associated with multiple RFICs. However, controlling multiple RFICs comes at power, complexity, die size, chip area or real estate, thermal tradeoffs, or the like. Thus, and as described in further detail herein, wireless communications system 100 may support efficient communications at upper mmW frequencies and others through the use of dynamic and autonomous selection of antenna subarrays.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A quasi co-location (QCL) relationship between one or more transmissions or signals may refer to a relationship between the antenna ports (and the corresponding signaling beams) of the respective transmissions. For example, one or more antenna ports may be implemented by a base station 105 for transmitting at least one or more reference signals (such as a downlink reference signal, a synchronization signal block (SSB), or the like) and control information transmissions to a UE 115. However, the channel properties of signals sent via the different antenna ports may be interpreted (e.g., by a receiving device) to be the same (e.g., despite the signals being transmitted from different antenna ports), and the antenna ports (and the respective beams) may be determined to be quasi co-located (QCLed). In such cases, the UE 115-b may have respective antenna ports for receive beams used for receiving the QCLed transmissions (e.g., the reference signal). QCLed signals may enable the UE 115 to derive the properties of a first signal (e.g., delay spread, Doppler spread, frequency shift, average power, etc.) transmitted on a first antenna port from measurements made on a second signal transmitted via a second antenna port. Additionally or alternatively, two antenna ports may be said to be spatially QCLed, where the properties of a signal sent over a directional beam may be derived from the properties of a different signal over another, different directional beam.

Different types of QCL relationships may describe the relation between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. A QCL-TypeD may refer to a QCL relationship of spatial parameters, which may indicate a relation between two or more directional beams used to communicate signals. Here, the spatial parameters indicate that a first beam used to transmit a first signal may be similar (or the same) as another beam used to transmit a second, different, signal, or, that the same receive beam may be used to receive both the first and the second signal. Thus, the beam information for various beams may be derived through receiving signals from a transmitting device, where, in some cases, the QCL information or spatial information may help a receiving device efficiently identify communications beams (e.g., without having to sweep through a large number of beams to identify the best beam (e.g., the beam having a highest signal quality)). In addition, QCL relationships may exist for both uplink and downlink transmissions and, in some cases, a QCL relationship may also be referred to as spatial relationship information.

In some examples, a transmission configuration indication (TCI) state configuration may include one or more parameters associated with a QCL relationship between transmitted signals. Here, a base station 105 may configure a QCL relationship, for example, that provides a mapping between a downlink reference signal and antenna ports of another signal (e.g., a demodulation reference signal (DMRS) antenna port for PDCCH, a DMRS antenna port for PDSCH, a CSI-RS antenna port for CSI-RS, or the like), and the TCI state may be indicated to the UE 115 by the base station 105. In such cases, the TCI state may be indicated via downlink control information (DCI) (e.g., within a control resource set (CORESET)), and the QCL relationship associated with the TCI state (and further established through higher-layer parameters) may provide the UE 115 with the QCL relationship for respective antenna ports and signals transmitted by the base station 105.

Wireless communications system 100 may support the dynamic selection of subsets of antenna elements within an array at a wireless device (e.g., a UE 115), which may be based on power consumption and link performance, or may be based on a configuration of components at the wireless device. For example, a wireless device may identify that it is configured with an antenna array having multiple antenna elements, and the wireless device may select respective subsets of antenna elements (e.g., subarrays) for uplink and downlink transmissions. In such cases, the selection may be based on a tradeoff of power consumption at the device (e.g., where more antenna elements in use may consume relatively more power) and link performance (e.g., where fewer antenna elements in use may limit some link performance). Additionally or alternatively, the selection may be based on a configuration of radio frequency (RF) components of the wireless device. In particular, the wireless device may have a limited number of RF components (e.g., low-noise amplifiers (LNAs) and/or power amplifiers (PAs)), and the wireless device may select antenna elements based on the capabilities and configuration of the available RF components. In any case, the wireless device may communicate based on the selection of different subsets of antenna elements of an array.

The dynamic selection of different subsets of antenna elements may enable the wireless device to efficiently communicate in RF spectrum bands (e.g., upper mmW bands, such as bands greater than 52.6 GHz, which may also be referred to as FR4), while also efficiently managing battery performance and power consumption, thermal output, link quality, or the like. In some examples, the wireless device may modify the number of antenna elements used through the selection of the respective subarrays, and transmit, to another device (e.g., a base station 105) an indication of a change in the number of antenna elements (or the size of the array used for uplink and/or downlink communications). As such, the base station 105 may adjust one or more communication parameters to account for the modification of the number of antenna elements. In addition, the selection of the subsets of antenna elements may not change a direction over which directional communications is established with the base station 105. As a result, an established QCL configuration for signals transmitted over a communication link 125 (e.g., a QCL relationship between signals transmitted by different antenna ports, as described herein) may remain unchanged despite the modification of the antenna elements used for communications. The base station 105 may accordingly not configure a different QCL mapping or provide a different QCL indication to the wireless device, which may thus enable the wireless device to dynamically adjust the number and set of antenna elements utilized for communications, while also minimizing signaling overhead in the system.

Figure 2:
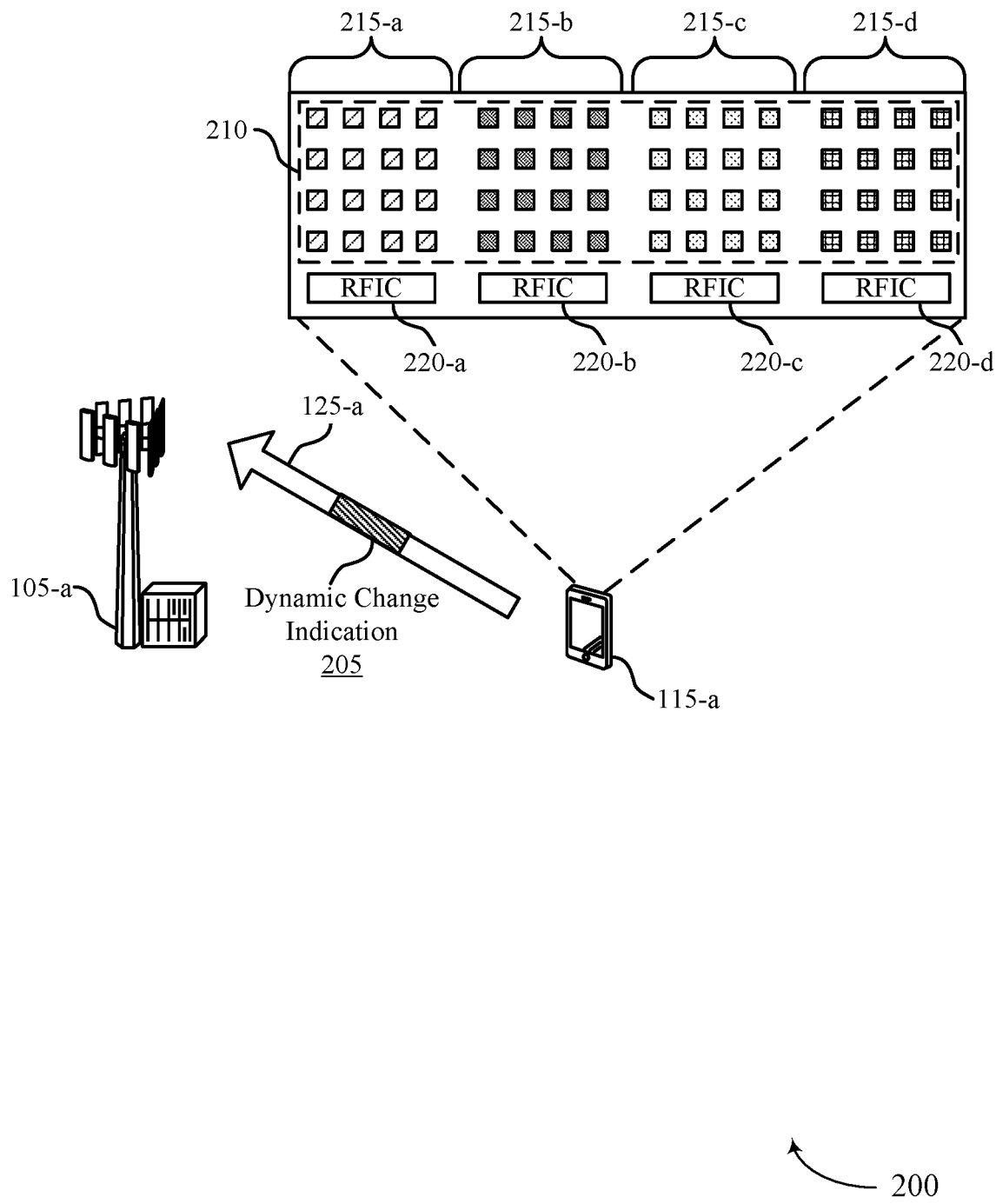
FIG. 2 illustrates an example of a wireless communications system that supports techniques for antenna subset selection in upper mmW bands in accordance with aspects of the present disclosure.

FIG. 2 illustrates an example of a wireless communications system 200 that supports techniques for antenna subset selection in upper mmW bands in accordance with aspects of the present disclosure. In some examples, wireless communications system 200 may implement aspects of wireless communications system 100. For instance, wireless communications system 200 includes UE 115-a and base station 105-a, which may be examples of the corresponding devices described with reference to FIG. 1. Additionally or alternatively, UE 115-a may be an example of a CPE, a relay node, a smart repeater with a decode and forward capability, a dumb repeater with an amplify and forward capability, a router, an IAB node, or the like. Similarly, base station 105-b may be an example of a backhaul node, an IAB node, or the like. Thus, although aspects of the present disclosure are described with reference to a UE 115 and base station 105, it is understood that the described techniques may be performed by a wireless device different from a UE 115 and base station 105. Stated another way, operations performed by UE 115-a and base station 105-a may be respectively performed by a UE 115, a base station 105, or another wireless device, and the example shown should not be construed as limiting.

Wireless communications system 200, may support a communication link 125-a between devices such as UE 115-a and base station 105-a, where UE 115-a and base station 105-a may communicate, for example, in RF spectrum bands corresponding to upper mmW bands. For example, UE 115-a and base station 105-a may operate over carrier frequencies in upper mmW bands (e.g., frequencies greater than 52.6 GHz). As a result, the communication link 125-a may be an example of a beamformed or directional communication link 125-a.

Wireless devices used in wireless communications system 200, such as UE 115-a and base station 105-a, may include antenna arrays configured for upper mmW bands and used to receive downlink and/or transmit uplink transmissions. As an example, UE 115-a may include or be configured with an antenna array 210 including of a number of antenna elements. In some cases, and as described herein, UE 115-a may be capable of autonomously and dynamically selecting one or more antenna subarrays 215, where each of the antenna elements may be arranged in one or more subarrays 215. Each subarray 215 may be coupled with an RFIC 220.

In some cases, the antenna elements may include an independent PA for uplink transmissions, an independent LNA for downlink receptions, or both. The PAs and/or LNAs may be rated for different radio frequency bandwidths. As an example, a PA may support a narrow frequency band (e.g., 57-64 GHz, 64-71 GHz) while an LNA may support a wider frequency band (e.g., 57-71 GHz). In some cases, device constraints such as equivalent isotropic radiated power (EIRP) restrictions may limit the amount of power a device can transmit. Accordingly, a PA may not be associated with all antenna elements. Likewise, UE 115-a may not need to use every antenna element of the antenna array 210.

When communicating with another device, such as base station 105-a, UE 115-a may use a subset of antenna elements for uplink transmissions and the same or a different subset of antenna elements for downlink transmissions. UE 115-a may dynamically select a subset of antenna elements from antenna array 210 (such as a subarray 215) to use for communications with base station 105-a. For example, UE 115-a may use subarray 215-a to send uplink transmissions and subarray 215-b to receive downlink transmissions. Additionally or alternatively, UE 115-a may use one subarray 215 for uplink transmissions in a lower part of the bandwidth and another subarray 215 for uplink transmissions in an upper part of the bandwidth. In yet another example, UE 115-a may use subarray 215-a and subarray 215-d for uplink transmissions (e.g., in respective portions of RF spectrum) while using some combination of subarrays 215-a, 215-b, 215-c or 215-d for downlink transmissions.

Base station 105-a and UE 115-a may be examples of devices capable of transmitting and/or receiving a dynamic change indication 205 to indicate a change in a number of active antenna elements. For example, UE 115-a may initially use antenna array 210 for communications with base station 105-a. UE 115-a may then choose to select a subset of antenna elements (e.g., a subarray 215) from the antenna array 210, and may indicate the selection, and the change in array size, with the dynamic change indication 205. The selection may be performed such that communications between UE 115-a and base station 105-a occur during a desired time interval (e.g., one or more symbols, one or more slots, one or more subframes). In some cases, UE 115-a may select a subarray 215 based on one or more operational parameters. Such operational parameters may include, but are not limited to, a power consumption level, a thermal overhead level, a communication rate threshold, a transmission reliability threshold, etc.

In some cases, the subset of antenna elements used for uplink transmissions may be different from the subset of antenna elements used for downlink transmissions. As an example, UE 115-a may select a first subset of antenna elements (e.g., subarray 215-a) from antenna array 210 to use in uplink transmissions to base station 105-a. Additionally or alternatively, UE 115-a may select a second subset of antenna elements (e.g., subarray 215-b) to use for downlink receptions from base station 105-a. In some cases, the QCL configuration between the devices may remain unchanged after the subset selection. In particular, the direction of the communication link 125-a may not change with the selection of different antenna subarrays 215, and base station 105-a and UE 115-a may continue to use the same QCL configuration as was previously established for communication link 125-a. Here, a QCL mapping/indication change may have a significant bearing on the behavior of base station 105-a (e.g., a TCI state may change, beam change request may be confirmed, etc.). However, UE 115-a may transmit dynamic change indication 205 to base station 105-a to inform the base station of the subset selections, thereby avoiding the reconfiguration of TCI states and related QCL configurations.

Base station 105-b may use the dynamic change indication 205 to adjust one or more transmission parameters (e.g., for power control and/or rate control loops). In such cases, base station 105-a may use the received signaling (e.g., the indication of the change in the size of the active antenna array at UE 115-a) to adjust communications parameters, which may include increasing or decreasing a transmission power, increasing or decreasing a transmission rate, or some other adjustment, based on the information within the indication (e.g., the dynamic change indication 205).

Additionally or alternatively, the subset selection may occur based on capabilities of the antenna elements, such as an RF bandwidth over which the antenna elements and the supporting circuitry are configured to communicate. Each subarray 215 may contain components (e.g., PAs, LNAs) suitable for communication in a particular frequency band (e.g., a PA may support a smaller bandwidth than an LNA for performance and/or efficiency). UE 115-a may select different subarrays 215 to be used for uplink and/or downlink communications in different portions of the bandwidth. As an example, subarray 215-a may include antenna elements equipped with PAs suitable for uplink transmissions in a first frequency band (e.g., 57-64 GHz, 24-29 GHz), while subarray 215-b may include antenna elements equipped with PAs suitable for uplink transmissions in a second frequency band (e.g., 64-71 GHz, 37-48 GHz). In some cases, both subarrays 215-a and 215-b may include antenna elements equipped with LNAs suitable for downlink receptions over the first and second frequency bands (e.g., 57-71 GHz, 24-48 GHz). In some cases, some antenna elements may be equipped for only downlink receptions (e.g., may include LNAs but may not include PAs). In some cases, the described RF components (e.g., of an RFIC 220) may be frequency dependent, where the performance of some components may differ based on frequencies or bandwidth in which the component is operating. In addition, multiple PAs may be used in an RFIC 220 because support of PAs over a wider RF bandwidth may be more difficult. Thus, the described techniques may include, for example, respective PAs configured for operation in relatively narrow bandwidths (e.g., as compared to a wider bandwidth), such as in FR4.

Each RFIC 220 (e.g., RFIC 220-a, 220-b, 220-c, and 220-d, in the present example) may be configured for uplink and downlink operation in different RF spectrum bands. As an example, a first RFIC 220-a associated with antenna subarray 215-a may be configured for low-band transmission and wide-band reception. Likewise, a second RFIC 220-b associated with antenna subarray 215-b may be configured low-band transmission in the uplink and wide-band reception in the downlink. Further, one or both of a third RFIC 220-c and a fourth RFIC 220-d associated with antenna subarrays 215-c and 215-d, respectively, may be configured for high-band transmission and wide-band reception. However, it is noted that these RFICs 220 may configured differently, and the examples given should not be considered limiting.

A change in the number of antenna elements used by UE 115-a may have implications on transmission configurations of base station 105-a. For example, a reduction in the size of an active antenna array may have an adverse effect on the link margin between UE 115-a and base station 105-a. Base station 105-a may receive, from UE 115-a, dynamic change indication 205 and may adjust a transmission power, a transmission rate, or both, according to the updated number of antenna elements.

FIGS. 3A, 3B, 3C, and 3D illustrate examples of antenna arrays 300 that support techniques for antenna subset selection in upper mmW bands in accordance with aspects of the present disclosure. In some examples, antenna arrays 300 may implement aspects of wireless communications systems 100 and 200. For example, antenna arrays 300-*a*, 300-*b*, 300-*c*, and 300-*d* may each be examples of an antenna array 210 used to enable a device (such as a UE 115) to autonomously change a number of antenna elements used to transmit or receive communications in an RF spectrum band, as described with reference to FIG. 2. In some aspects, each antenna array 300 may include a number of antenna elements 305, where a portion of the antenna elements 305 may be selected in various subarrays 310 having a subset of antenna elements 305. It is noted that the dimensions of the antenna arrays 300 are provided for illustrative purposes only and should not be considered limiting, as antenna arrays having different sizes and/or dimensions are also possible. In some cases, each of the antenna arrays 300-*a*, 300-*b*, 300-*c*, and 300-*d* may be configured for communications in FR4, as described herein.

As described herein, a wireless device may select different portions of an antenna array 300 to use for uplink and downlink communications. Such selection may be based on a tradeoff of power management parameters and link performance parameters. In other examples, the selection of the portions of an antenna array 300 may be based on a hardware configuration of, for example, RF components of the wireless device.

Figure 3A:
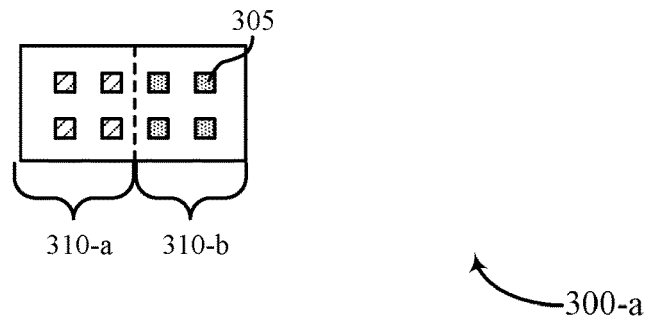
FIGS. 3A, 3B, 3C, and 3D illustrate examples of antenna subarrays that support techniques for antenna subset selection in upper mmW bands in accordance with aspects of the present disclosure.

In a first illustrative example, FIG. 3A illustrates an antenna array 300-*a* that may include subarrays 310. Antenna array 300-*a* may be an example of a 4×2 array, and subarrays 310-*a* and 310-*b* may each include four antenna elements 305. The antenna elements 305 may be arranged in a planar array pattern (e.g., a 2×2 grid), a linear array pattern, or some combination thereof.

The antenna elements 305 of each subarrays 310-*a* and 310-*b* may be associated with RF components (e.g., LNAs, PAs, etc.) suitable for wireless communications in some RF spectrum band. For example, antenna elements 305 in subarray 310-*a* may include PAs suitable for uplink transmissions in a first frequency band (e.g., 57-64 GHz) while antenna elements in subarray 310-*b* may include PAs suitable for uplink transmissions in a second frequency band (e.g., 64-71 GHz). In some examples, antenna elements in both subarrays 310-*a* and 310-*b* may include LNAs suitable for downlink receptions over a wide frequency band (e.g., 57-71 GHz).

As described, a device (such as a UE 115) being configured with antenna array 300-*a* may select a subset of antenna elements to use for communications within the device's operating frequency (e.g., 57-71 GHz). Selection of the subarrays may be dependent on conditions such as operating parameters, power and performance tradeoffs, or RF component capabilities. For example, a UE 115 may select subarray 310-*a* for uplink transmissions in the lower frequency band (e.g., 57-64 GHz), which may be based on the capabilities of the RF components in the subarray. Likewise, the UE 115 may select subarray 310-*b* for uplink transmissions in the higher frequency band (e.g., 64-71 GHz). In some examples, downlink transmissions may be received on the entire antenna array 300-*a*.

Figure 3B:
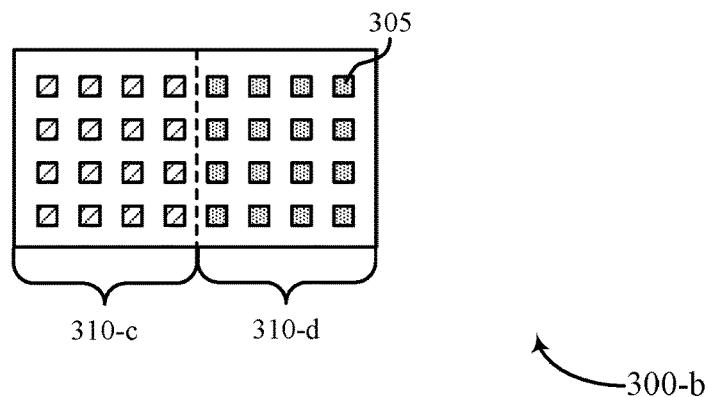

FIG. 3B illustrates another example of an antenna array 300-*b* (e.g., an 8×4 array) having antenna elements 305 that may be included in respective subarrays 310. As described in FIG. 3A, each subarray 310-*c* and 310-*d* may include RF components capable of transmitting and/or receiving communications in the same or different portions of a device's operating frequency. As an example, PAs in subarray 310-*c* may support a narrow low-frequency band (e.g., 57-64 GHz), while PAs in subarray 310-*d* may support a narrow high-frequency band (e.g., 64-71 GHz). Thus, the UE 115 may use subarray 310-*c* to send uplink transmissions in the low frequency band and subarray 310-*d* to send uplink transmission in the high frequency band. In some cases, all antenna elements within antenna array 300-*b* may include an LNA capable of receiving downlink transmissions in a bandwidth (e.g., 57-71 GHz).

Figure 3C:
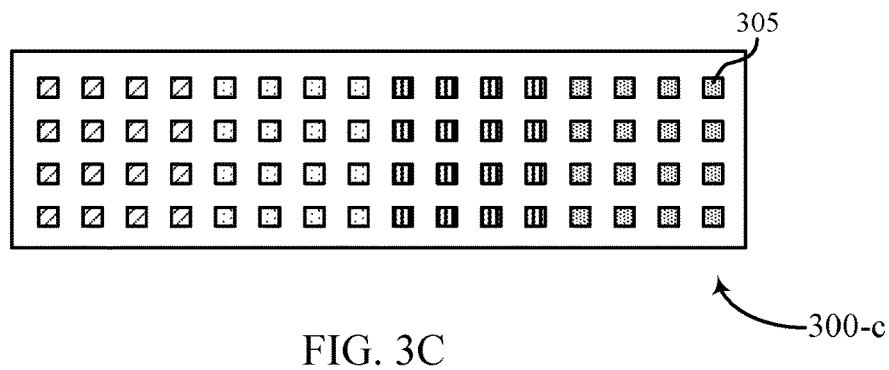

FIG. 3C illustrates another example of an antenna array 300-*c* that may include multiple antenna elements 305, which may be configured in a 16×4 array. In some cases, all antenna elements 305 of an antenna array (such as antenna array 300-*c*) may be capable of receiving downlink transmissions. In other examples, the UE 115 may select less than all of the antenna elements 305 for uplink and/or downlink communications. As such, a UE 115 may select the antenna elements of antenna array 300-*c* for receiving downlink transmissions, whereas a different subset of antenna elements 305 may be selected for downlink transmissions, as described with reference to FIG. 3D.

Figure 3D:
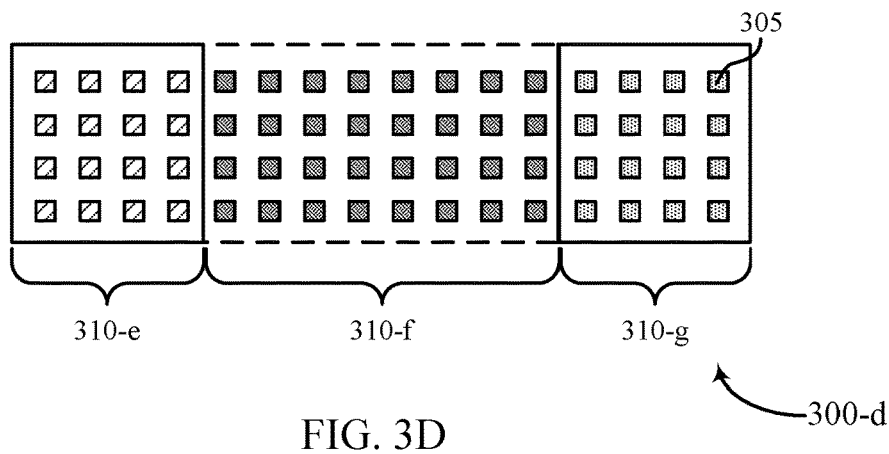

For instance, FIG. 3D illustrates another example of an antenna array 300-*d* that may include subarrays 310. In some cases, one or more subarrays 310 may be used for uplink transmissions while other subarrays remain inactive during uplink transmissions. For example, in antenna array 300-*d*, subarray 310-*e* may contain antenna elements with PAs equipped for use in a first frequency band (e.g., 57-64 GHz) and may be used for uplink transmissions in that frequency band. Subarray 310-*g* may include antenna elements with PAs equipped for use in a second frequency band (e.g., 64-71 GHz). In some cases, the UE 115 may not use every antenna element 305 of an antenna array 300. As such, the antenna elements 305 within the subarray 310-*f* may not be used (e.g., for uplink transmissions). It is also noted that the frequency ranges described herein are provided for illustrative purposes only, and different frequency ranges may be used, for example, for the low-band, the high-band, and the wide-band frequencies when selecting antenna elements for subarrays.

Figure 4:
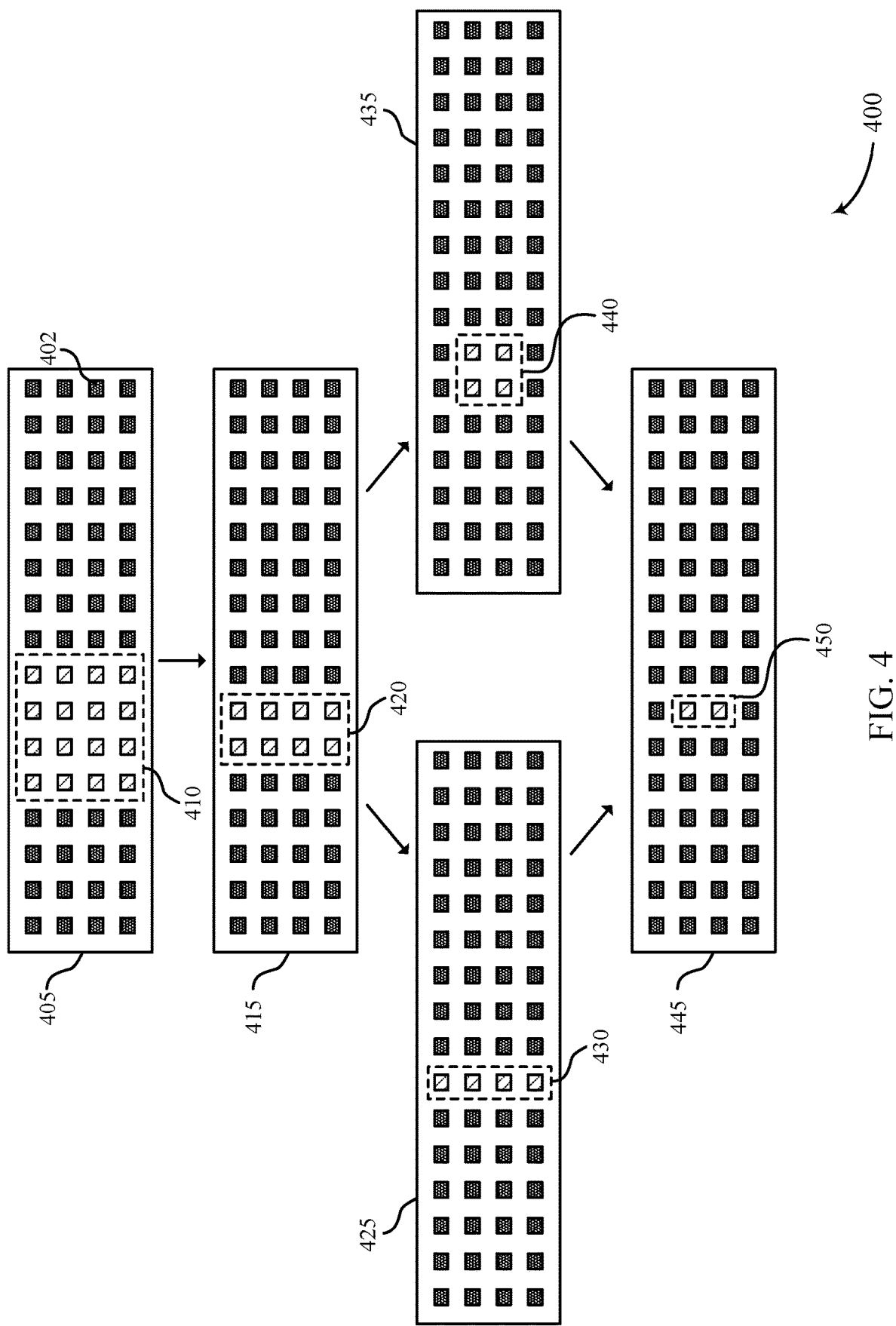
FIG. 4 illustrates an example of an antenna subarray selection scheme that supports techniques for antenna subset selection in upper mmW bands in accordance with aspects of the present disclosure.

FIG. 4 illustrates an example of an antenna subarray selection scheme 400 that supports techniques for antenna subset selection in upper mmW bands in accordance with aspects of the present disclosure. In some examples, the antenna subarray selection scheme 400 may implement aspects of wireless communications system 100 and 200. For example, a wireless device, such as a UE 115, a CPE, a repeater (e.g., a smart repeater with a decode and forward capability, a dumb repeater with an amplify and forward capability), a router, or other device, may use the antenna subarray selection scheme 400 when selecting different subsets of antenna elements 402. In some cases, the antenna subarray selection scheme 400 may be used to dynamically modify a size of an antenna array across different time intervals (e.g., symbols, slots, subframes, etc.) while communicating with another wireless device.

Antenna subarray selection scheme 400 may include iteratively selecting subsets of antenna arrays (e.g., subsets of antenna elements 402) based on a status of communications and/or one or more parameters associated with a wireless device and a communications link. For instance, the wireless device (e.g., a UE 115) may determine to reduce the number of antenna elements 402 used for uplink and/or downlink communications based on a level of power consumption at the UE 115. In some cases, the selection of the smaller array may also be based on a possible reduction in link quality (e.g., due to the use of fewer antenna elements 402) that the UE 115 may accept in order to save power (e.g., if a battery level or an amount of energy use satisfies a threshold). In addition, while the antenna subarray selection scheme 400 illustrates the selection of subsets of antenna elements 402 to form larger subarrays to smaller subarrays, it is also possible for a wireless device to select larger subarrays from smaller subarrays (e.g., in an opposite order from that shown in FIG. 4). Similarly, a wireless device may autonomously select more, fewer, or different subsets of antenna elements for directional communications (e.g., in FR4) based and dynamically changing channel conditions, data transmissions, and energy use.

As an illustrative example, antenna subarray selection scheme 400 may provide for techniques performed by a UE 115 to select one or more different antenna elements 402. For instance, at 405, the device may select an initial 4×4 planar subarray 410. At 415, the device may select a 4×2 planar array 420. 425 and 435 may be examples of alternative subsequent selections. At 425, the device may select a 4×1 linear array. Alternatively, at 430, the device may select a 2×2 planar array. At 445, the device may select a final linear 2×1 array. In some cases, the selection of subarrays may be performed in such a way that different antenna elements 402 form a particular pattern (e.g., a planar array pattern, a linear array pattern, or a combination thereof).

In some cases, antenna subarray selection scheme 400 may be performed such that the antennas being used may change according to a desired time interval. For example, the active antenna elements (e.g., subarrays 410) may be used during a time interval including one or more slots, one or more symbols, one or more subframes, or some combination thereof, and a different set of active antenna elements 402 may be used during another, different time interval including one or more slots, one or more symbols, one or more subframes, or some combination thereof.

In some cases, antenna subarray selection scheme 400 may occur without changing the QCL mapping and/or QCL indication of the established link between two devices. The first device may indicate, to the second device, a dynamic change in the first subset of antennas, and the second device may use the indication in power control or rate control loops. The device may determine any of the steps and still maintain power-performance tradeoffs with no further QCL indication to the base station. The cluster direction determined by any subset of antennas in the selection process may remain the same as the direction determined by the initial subarray 410.

Figure 5:
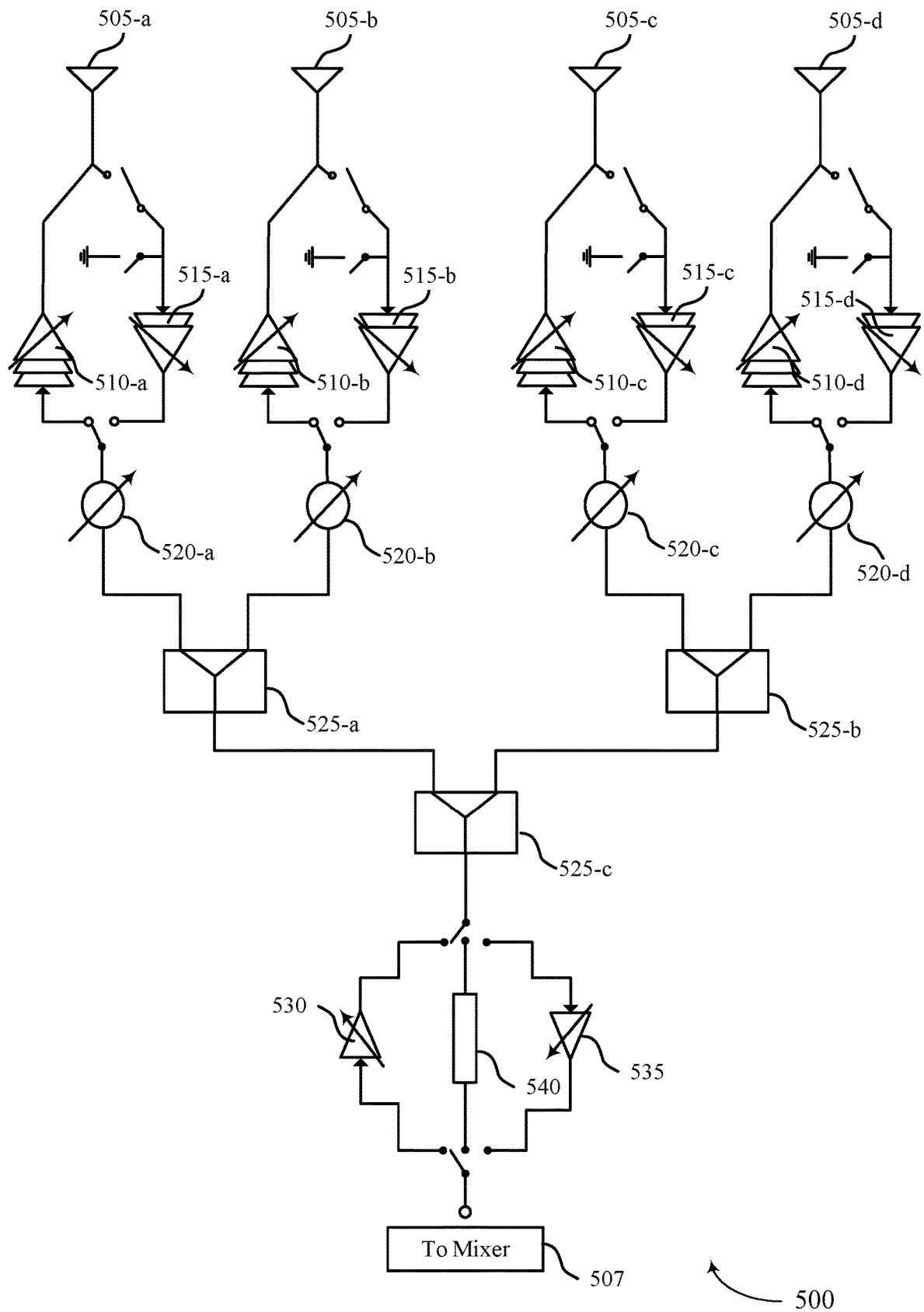
FIGS. 5 and 6 illustrate examples of a radio frequency integrated circuit (RFIC) front end that supports techniques for antenna subset selection in upper mmW bands in accordance with aspects of the present disclosure.

FIG. 5 illustrates an example of an RFIC front end 500 that supports techniques for antenna subset selection in upper mmW bands in accordance with aspects of the present disclosure. In some examples, the RFIC front end 500 may implement aspects of wireless communications system 100 and 200. For instance, the RFIC front end 500 may be an example of at least a portion of an RFIC 220 described with reference to FIG. 2. As such, the RFIC front end 500 may be an example of one or more RF components of a wireless device that may be associated with an antenna array, and may be used for wireless communications for various frequency bands.

In some cases, the RFIC front end 500 may be an example of RF circuitry associated with four (4) communications channels, for example, for transmission and reception in FR4 or upper mmW bands. In the illustrated example of FIG. 5, the RFIC front end 500 may represent an example of RF components configured for transmission in a lower band (e.g., 57-64 GHz) in the uplink and reception in a wide band (e.g., 57-71 GHz). However, higher band (e.g., 64-71 GHz) transmission and wide band reception may also be possible with the configuration illustrated by RFIC front end 500.

The RFIC front end 500 may include multiple antennas 505 (e.g., antennas 505-a, 505-b, 505-c, and 505-d), which may be examples of one or more antenna elements described herein. The RFIC front end 500 may likewise be coupled with one or more mixers 507. Each antenna 505 may be coupled with one or more PAs 510 and an LNA 515. Each of the PAs 510 and LNAs 515 may be configured to efficiently operate within some range of frequency bands. As an example, antenna 505-a may be coupled with a low-band PA 510-a and a wide-band LNA 515-a, which may in turn be coupled with a wideband phase shifter 520-a. In other examples, PAs 510 may be high-band PAs. In addition, the PAs 510 and LNAs 515 may be coupled with a phase shifter 520.

Phase shifters 520 may be coupled with a combiner/splitter 525. In some cases, one or more antennas 505 may be inputs/outputs for a single combiner/splitter 525. For example, antennas 505-a and 505-b may be coupled with a combiner/splitter 525-a, and antennas 505-c and 505-d may be coupled with a combiner/splitter 525-b. In some cases, combiners/splitters 525-a and 525-b may further be connected to an additional combiner/splitter 525-c. Combiner/splitter 525-c may be coupled with to a low-band transmitting variable gain amplifier (TXVGA) 530, a resistor 540, and a wide-band receiving VGA (RXVGA) 535. Each component 530, 535, and 540 may converge at a connection to the mixer 507.

In some cases, RFIC front end 500 may be used for low-band or high-band transmitting and wide-band receiving. For instance, the RFIC front end 500 may be used for wide-band downlink reception using a first subset of antenna elements and narrow-band (e.g., low-band or high-band) transmission using a second subset of antenna elements. In such cases, the selection of the subsets of antenna elements may be based on the RF circuitry illustrated in RFIC front end 500, such as the PAs 510 and the LNAs 515.

Figure 6:
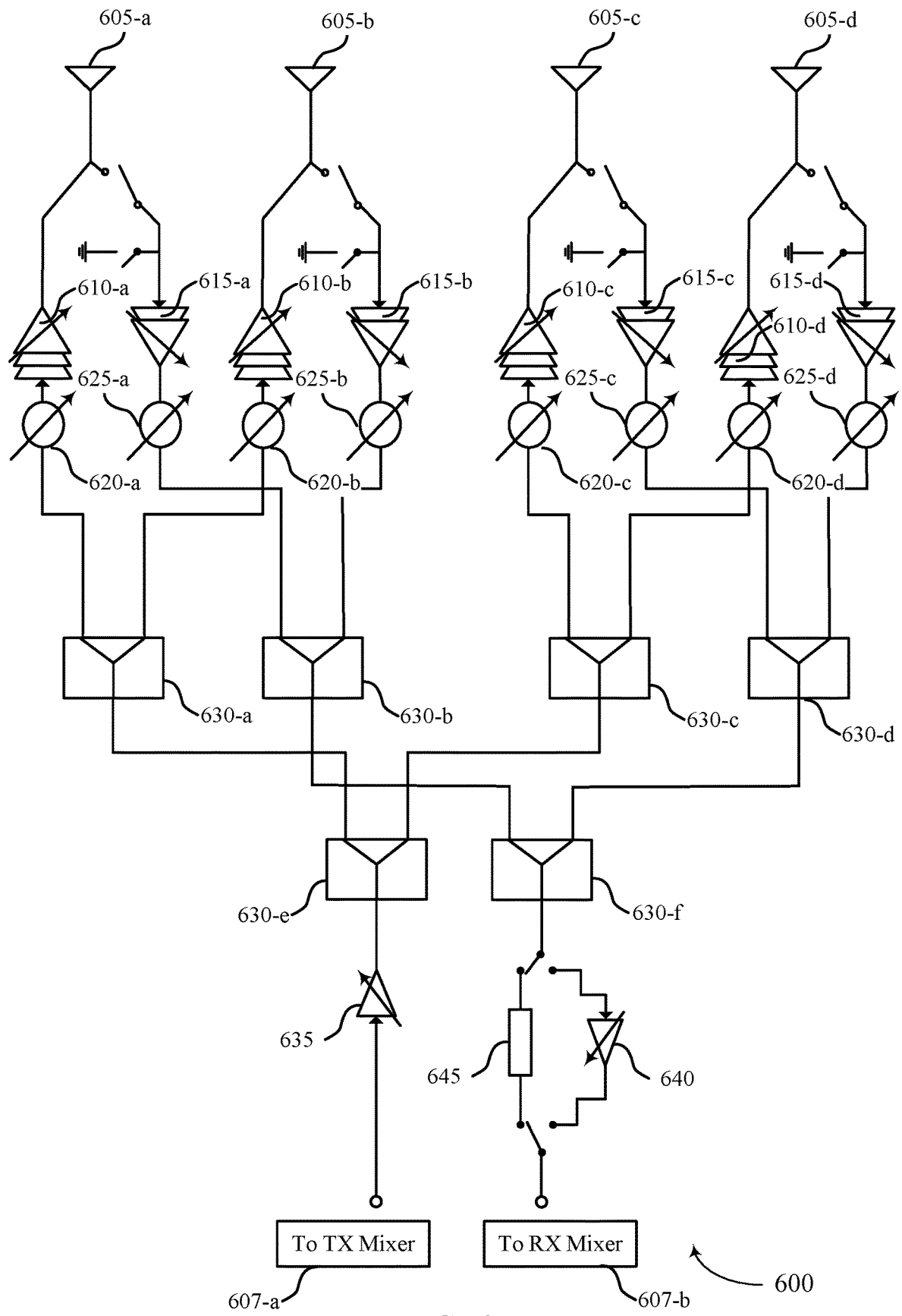

FIG. 6 illustrates an example of an RFIC front end 600 that supports techniques for antenna subset selection in upper mmW bands in accordance with aspects of the present disclosure. In some examples, the RFIC front end 600 may implement aspects of wireless communications systems 100 and 200. For instance, the RFIC front end 600 may be an example of at least a portion of an RFIC 220 described with reference to FIG. 2. As such, the RFIC front end 600 may be an example of one or more RF components of a wireless device that may be associated with an antenna array, and may be used for wireless communications for a various frequency bands.

In some cases, the RFIC front end 600 may be an example of RF circuitry associated with four (4) communications channels, for example, for transmission and reception in FR4 or upper mmW bands. In the example of FIG. 6, the RFIC front end 600 may represent an example of RF components configured for uplink transmission in a lower band (e.g., 57-64 GHz) and downlink reception in a wide band (e.g., 57-71 GHz).

The RFIC front end 600 may include multiple antennas 605 (e.g., antennas 605-a, 605-b, 605-c, and 605-d), which may be examples of one or more antenna elements described herein. The RFIC front end 600 may likewise be coupled with one or more mixers 607 (e.g., mixer 607-*a* and mixer 607-*b*). Each antenna 605 may be coupled with one or more PAs 610 and one or more LNAs 615. Each of the PAs 610 and LNAs 615 may be configured to efficiently operate within some range of frequency bands. PAs 610 and LNAs 615 may be coupled with a phase shifter 620 or 625. As an example, antenna 605-*a* may be coupled with a low-band PA 610-*a* and a wide-band LNA 615-*a*. PA 610-*a* may be in series with low-band phase shifter 620-*a* and LNA 615-*a* may likewise be in series with a wideband phase shifter 625-*a*. In other examples, PAs 610 may be high-band PAs and may connect to high-band phase shifters 620. As illustrated, transmission phase shifters 620 and reception phase shifters 620 may be separate from each other, where each of the phase shifters 620 may be configured as active phase shifters 620.

Phase shifters 620 and 625 may be connected to a combiner/splitter 630. In some cases, one or more antennas 605 may be coupled with a single combiner/splitter 630. For example, combiner/splitter 630-*a* may couple antennas 605-*a* and 605-*b*. In some cases, combiners/splitters 630-*a* and 630-*c* may further be coupled with combiner/splitter 630-*e*, and combiners/splitters 630-*b* and 630-*d* may be coupled with combiner/splitter 630-*f*.

As an example, combiner/splitter 630-*e* may be connected to a low-band TXVGA 635, which is in turn coupled with a transmission mixer 607-*a*. Combiner/splitter 630-*f* may be coupled with a resistor 645 and a wide-band RXVGA 640, which are both in turn coupled with a receiving mixer 607-*b*. In some cases, one or more combiners/splitters 630 may be connected to one or more separate mixers 607, such as the transmission mixer 607-*a* and the reception mixer 607-*b*. In other examples, transmission and reception mixers 607 may be shared (e.g., as described with reference to FIG. 5).

In some cases, RFIC front end 600 may be used for low-band transmitting and wide-band receiving. Each antenna 605 may have a transmitting circuit including a low-band PA 610, a low-band phase shifter 620, and a low-band TXVGA 635. The transmission circuits of each antenna 605 may be combined at one or more combiner/splitters 630 and may connect to a transmission mixer. Similarly, each antenna 605 may have a receiving circuit including a wide-band LNA 615, a wide-band phase shifter 625, a wide-band receiving VGA 640, and a resistor 645. Thus, the RFIC front end 600 may be used for wide-band downlink reception using a first subset of antenna elements and narrow-band (e.g., low-band) transmission using a second subset of antenna elements. In such cases, the selection of the subsets of antenna elements may be based on the RF circuitry illustrated in RFIC front end 600, such as the PAs 610 and the LNAs 615.

Figure 7:
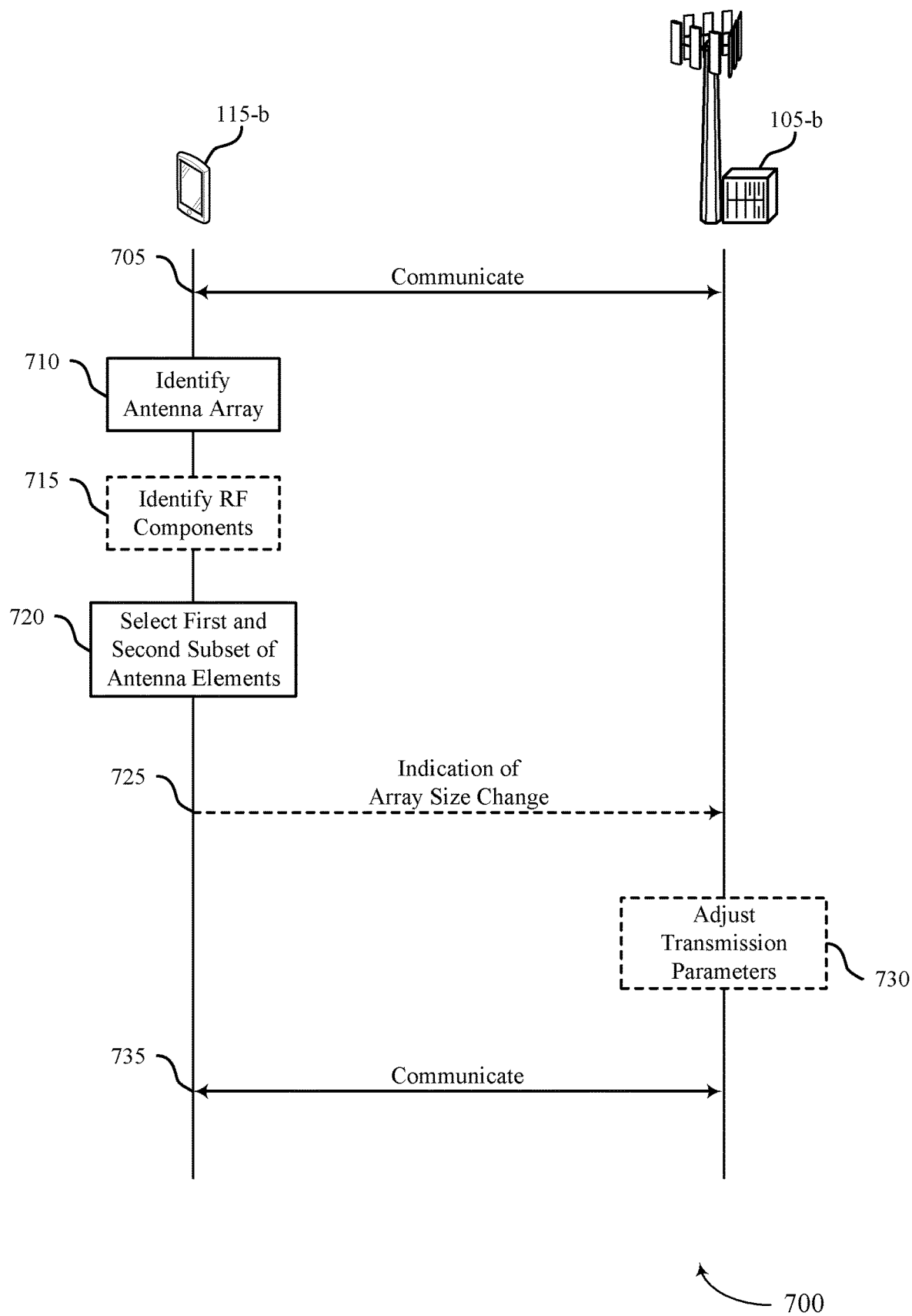
FIG. 7 illustrates an example of a process flow in a system that supports techniques for antenna subset selection in upper mmW bands in accordance with aspects of the present disclosure.

FIG. 7 illustrates an example of a process flow 700 in a system that supports techniques for antenna subset selection in upper mmW bands in accordance with aspects of the present disclosure. In some examples, process flow 700 may implement aspects of wireless communications systems 100 and 200. For example, process flow 700 includes UE 115-*b* and base station 105-*b*, which may be examples of the corresponding devices described with reference to FIGS. 1 and 2. Additionally, the operations in process flow 700 performed by UE 115-*b* and base station 105-*b* may be respectively performed by a UE 115, a base station 105, or another wireless device, and the example shown should not be construed as limiting. For instance, the operations shown as performed by UE 115-*b* may be performed by another wireless device, such as a repeater or CPE, and the operations shown as performed by base station 105-*b* may be performed by wireless device such as a backhaul node or IAB node.

The techniques described by process flow 700 may provide for the dynamic selection of different subarrays based on a configuration of components at a wireless device. Additionally or alternatively, the subarrays may be selected based on various parameters related to a tradeoff between power consumption and link performance. In any case, process flow 700 may illustrate the selection of antenna elements for uplink and downlink communications to enable efficient communications (e.g., in RF spectrum bands that are greater than 52.6 GHz).

At 705, UE 115-*b* and base station 105-*b* may communicate with each other over a communication link. For example, UE 115-*b* and base station 105-*b* may establish the communication link via an access procedure. In some examples, base station 105-*b* may provide UE 115-*b* with an indication of a QCL relationship between signals transmitted over the link. As described above, a TCI state may be signaled to UE 115-*b* via DCI, which may indicate a QCL mapping between one or more downlink reference signals and another signal (such as a DMRS for a PDSCH). As such, UE 115-*b* may identify the configured QCL relationship and may communicate with base station 105-*b* based on the QCL configuration.

At 710, UE 115-*b* may identify an antenna array including a set of antenna elements, where the antenna array may be used for communicating over the link with base station 105-*b*.

At 715, UE 115-*b* may identify a configuration of one or more RF components associated with the antenna array. For example, UE 115-*b* may identify a set of one or more PAs and a set of one or more LNAs. As described herein, the number of PAs and LNAs at UE 115-*b* may be constrained (e.g., by a form factor of UE 115-*b*, or based on fabrication parameters or cost of forming the control circuitry associated with the antenna array of UE 115-*b*, or the like). Thus, UE 115-*b* may have knowledge of a number of LNAs available for downlink reception (e.g., one LNA) using an entire array, as well as a number of PAs available for uplink transmission (e.g., two PAs) using two or more portions of the array. In some examples, a first PA of the set of one or more PAs is configured to operate with a first range of RF spectrum bands (e.g., 57-64 GHz, which may be referred to as a lower band) and a second PA of the set of one or more PAs is configured to operate in a second range of RF spectrum bands different from the first range (e.g., 64-71 GHz, which may be referred to as a higher band). In some examples, an LNA of the set of one or more LNAs may be configured to operate in a third range of RF spectrum bands that includes at least the first range and the second range (e.g., 57-71 GHz, which may be referred to as a wide band).

At 720, UE 115-*b* may select, from the set of antenna elements, a first subset of antenna elements for uplink transmissions and a second subset of antenna elements for downlink transmissions. For instance, as described with reference to FIGS. 3A, 3B, 3C, and 3D, UE 115-*b* may select a first portion of the antenna array for uplink transmission in a first frequency range (e.g., 57-64 GHz) and a second portion of the antenna array for uplink transmissions in a second frequency range (e.g., 64-71 GHz). Further, a second portion of the antenna array may be used for receiving downlink transmission over a third frequency range (e.g., 57-71 GHz).

In other examples, UE 115-*b* may identify a first number of antenna elements from the set of antenna elements for communicating with base station 105-*b* during a first time interval (e.g., a first symbol, slot, subframe, etc.). UE 115-*b* may then select a second number of antenna elements that is less than the first number of antenna elements, where the second number of antenna elements are used for communicating over the link with base station 105-*b* during a second time interval (e.g., a second, subsequent symbol, slot, subframe, etc.). UE 115-*b* may also select a third number of antenna elements that is less than the second number of antenna elements communicate over the link with base station 105-*b* during a third time interval (e.g., a third symbol, slot, or subframe following the second symbol, slot, or subframe) using the third number of antenna elements (e.g., as described with reference to FIG. 4). In some cases, the selection of the respective subsets of antenna elements may be based on one or more operational parameters associated with power and link performance.

Further, the QCL configuration for the signals transmitted over the link may remain unchanged after the described selection. Put another way, although UE 115-*b* may modify the number of antenna elements used for uplink and/or downlink communications with base station 105-*b*, base station 105-*b* may not need to signal an updated QCL mapping for signals transmitted over the link, for example, because the direction over which directional communications in the link between base station 105-*b* and UE 115-*b* may remain similar or the same. As such, the communications over the link may continue using the same QCL configuration, as was previously indicated and configured for the prior communications with UE 115-*b*.

Additionally or alternatively, UE 115-*b* may select the first subset of antenna elements for uplink transmissions and the second subset of antenna elements for downlink transmissions based on a hardware configuration for components associated with the antenna array. In particular, UE 115-*b* may make the selection of the antenna elements (e.g., the antenna subarrays) based on the configuration of the RF components. As described herein, the configuration may include, for example, one LNA used for downlink reception over a wide band in addition to two PAs for uplink transmission over a lower band and an upper band, respectively. In cases where UE 115-*b* may have a limited number of RF components (e.g., to conserve/minimize die size and maintain a relatively small form factor, as well as other factors) associated with the array, the selection of subarrays based on RF component constraints may enable UE 115-*b* to dynamically select antenna elements coupled with components best suited for communications in a given frequency range, thereby avoiding inefficient operations while also minimizing the complexity of the device. Here, the dynamic selection of subsets of antenna elements for uplink and downlink communications may be based on how each RF component is configured (e.g., a range of frequencies that a PA and/or LNA may be optimized for operation).

In some examples, at 725, UE 115-*b* may optionally transmit, and base station 105-*b* may receive, an indication that a number of antenna elements used by UE 115-*b* has changed based on the selected first subset of antenna elements and the second subset of antenna elements. Put another way, because an array size may have dynamically changed at UE 115-*b* (e.g., as compared to when UE 115-*b* and base station 105-*b* previously communicated over the link), UE 115-*b* may provide an indication of the change in the array size (e.g., a dynamic change indication, as described with reference to FIG. 2) due to the selection of the first subset and second subset of antenna elements.

The size change of the antenna array may result in some changes to link performance, for example, cause by a reduced number of antenna elements used for receiving downlink transmissions over the link. As such, at 730, base station 105-*b* may optionally adjust one or more transmission parameters to maintain efficient communications. For instance, base station 105-*b* may adjust (e.g., increase) a transmission power, adjust (e.g., decrease) a transmission rate, or make some other adjustment to communications parameters with UE 115-*b* over the link. However, as noted above, the dynamic selection of subsets of antenna elements may not require base station to provide an indication of a different QCL relationship for signals transmitted over the link.

At 735, UE 115-*b* and base station 105-*b* may communicate over the link with the based on the selected first subset of antenna elements and the second subset of antenna elements. In some examples, UE 115-*b* and base station 105-*b* may communicate over the link based on the adjusted transmission power, the adjusted transmission rate, or a combination thereof.

Figure 8:
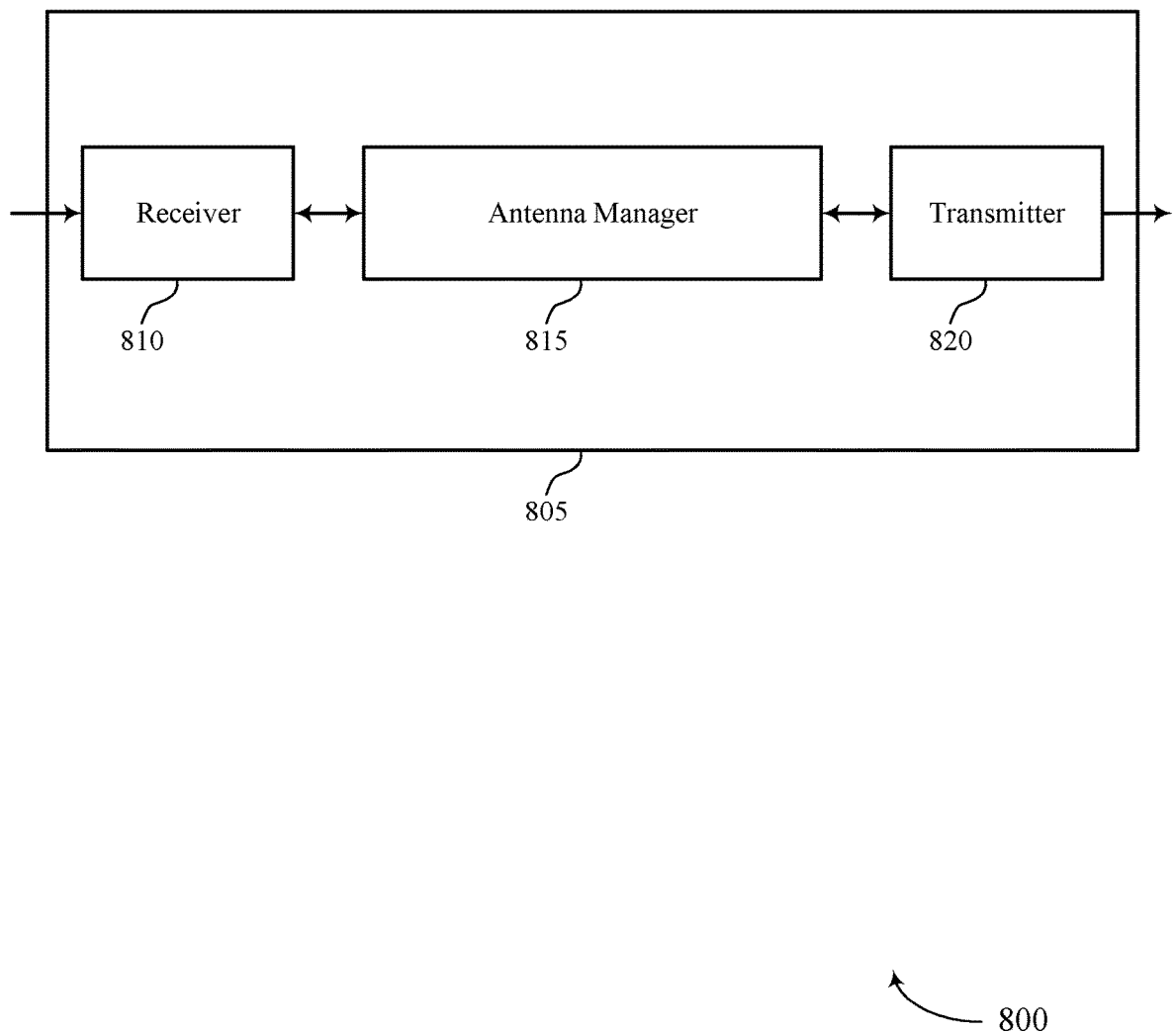
FIGS. 8 and 9 show block diagrams of devices that support techniques for antenna subset selection in upper mmW bands in accordance with aspects of the present disclosure.

FIG. 8 shows a block diagram 800 of a device 805 that supports techniques for antenna subset selection in upper mmW bands in accordance with aspects of the present disclosure. The device 805 may be an example of aspects of a wireless device, such as a UE 115, as described herein. The device 805 may include a receiver 810, an antenna manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for antenna subset selection in upper mmW bands, etc.). Information may be passed on to other components of the device 805. The receiver 810 may be an example of aspects of the transceiver 1120 described with reference to FIG. 11. The receiver 810 may utilize a single antenna or a set of antennas.

The antenna manager 815 may identify an antenna array including a set of antenna elements, the antenna array used for communicating over a link with a second wireless device, select, from the set of antenna elements, a first subset of antenna elements for uplink transmissions and a second subset of antenna elements for downlink transmissions, the selection being based on one or more operational parameters associated with power and link performance, where a QCL configuration for signals transmitted over the link is unchanged after the selection, and communicate over the link with the second wireless device based on the selected first subset of antenna elements and the second subset of antenna elements.

The antenna manager 815 may also identify an antenna array and a configuration of one or more RF components associated with the antenna array, the antenna array including a set of antenna elements, select, from the set of antenna elements, a first subset of antenna elements for uplink transmissions and a second subset of antenna elements for downlink transmissions, the selection being based on the configuration of the one or more RF components, and communicate over a link with a second wireless device based on the selected first subset of antenna elements and the second subset of antenna elements. The antenna manager 815 may be an example of aspects of the antenna manager 1110 described herein.

The antenna manager 815, or its sub-components, may be implemented in hardware, code (e.g., software or firmware)

executed by a processor, or any combination thereof. If implemented in code executed by a processor, the functions of the antenna manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The antenna manager 815, or its sub-components, may be physically located at various positions, including being distributed such that portions of functions are implemented at different physical locations by one or more physical components. In some examples, the antenna manager 815, or its sub-components, may be a separate and distinct component in accordance with various aspects of the present disclosure. In some examples, the antenna manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

By including or configuring the antenna manager 815 in accordance with examples as described herein, the device 805 (e.g., a processor controlling or otherwise coupled to the receiver 810, the transmitter 820, the communications manager 815, or a combination thereof) may support techniques for dynamically selecting subsets of antenna elements within an array. The device 805 may manage power consumption and thermal output at the device 805 by selecting antenna subsets accordingly. For instance, the device 805 may use less than a full antenna array and thus fewer RF components, which may reduce power consumption and thermal output.

Figure 9:
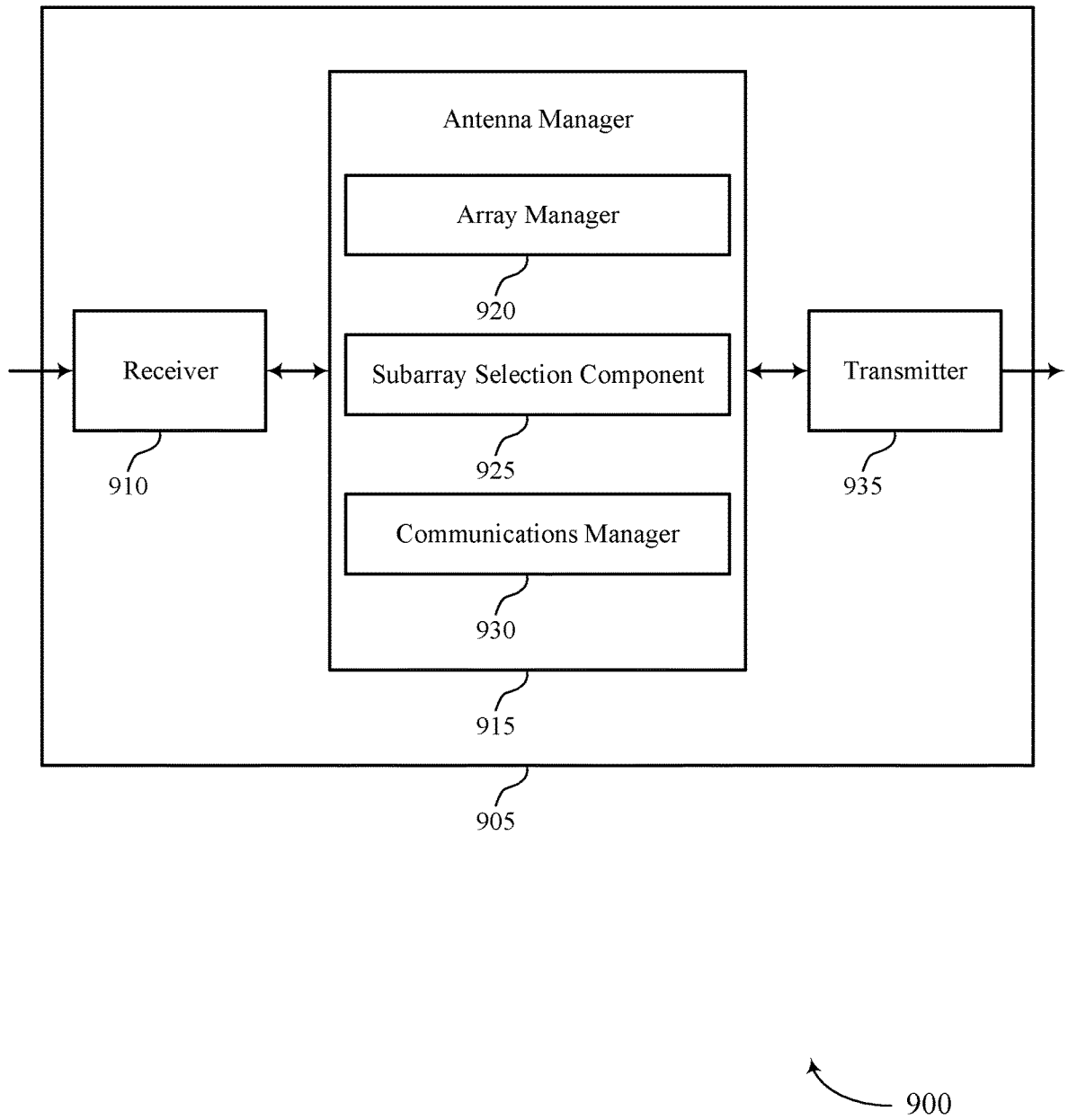

FIG. 9 shows a block diagram 900 of a device 905 that supports techniques for antenna subset selection in upper mmW bands in accordance with aspects of the present disclosure. The device 905 may be an example of aspects of a device 805, such as a wireless device (e.g., a UE 115, a CPE, a relay node, a smart repeater with a decode and forward capability, a dumb repeater with an amplify and forward capability, a router, an IAB node, or the like) as described herein. The device 905 may include a receiver 910, an antenna manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to techniques for antenna subset selection in upper mmW bands, etc.). Information may be passed on to other components of the device 905. The receiver 910 may be an example of aspects of the transceiver 1120 described with reference to FIG. 11. The receiver 910 may utilize a single antenna or a set of antennas.

The antenna manager 915 may be an example of aspects of the antenna manager 815 as described herein. The antenna manager 915 may include an array manager 920, a subarray selection component 925, and a communications manager 930. The antenna manager 915 may be an example of aspects of the antenna manager 1110 described herein.

The array manager 920 may identify an antenna array including a set of antenna elements, the antenna array used for communicating over a link with a second wireless device.

The subarray selection component 925 may select, from the set of antenna elements, a first subset of antenna elements for uplink transmissions and a second subset of antenna elements for downlink transmissions, the selection being based on one or more operational parameters associated with power and link performance, where a QCL configuration for signals transmitted over the link is unchanged after the selection.

The communications manager 930 may communicate over the link with the second wireless device based on the selected first subset of antenna elements and the second subset of antenna elements.

The array manager 920 may identify an antenna array and a configuration of one or more RF components associated with the antenna array, the antenna array including a set of antenna elements.

The subarray selection component 925 may select, from the set of antenna elements, a first subset of antenna elements for uplink transmissions and a second subset of antenna elements for downlink transmissions, the selection being based on the configuration of the one or more RF components.

The communications manager 930 may communicate over a link with a second wireless device based on the selected first subset of antenna elements and the second subset of antenna elements.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
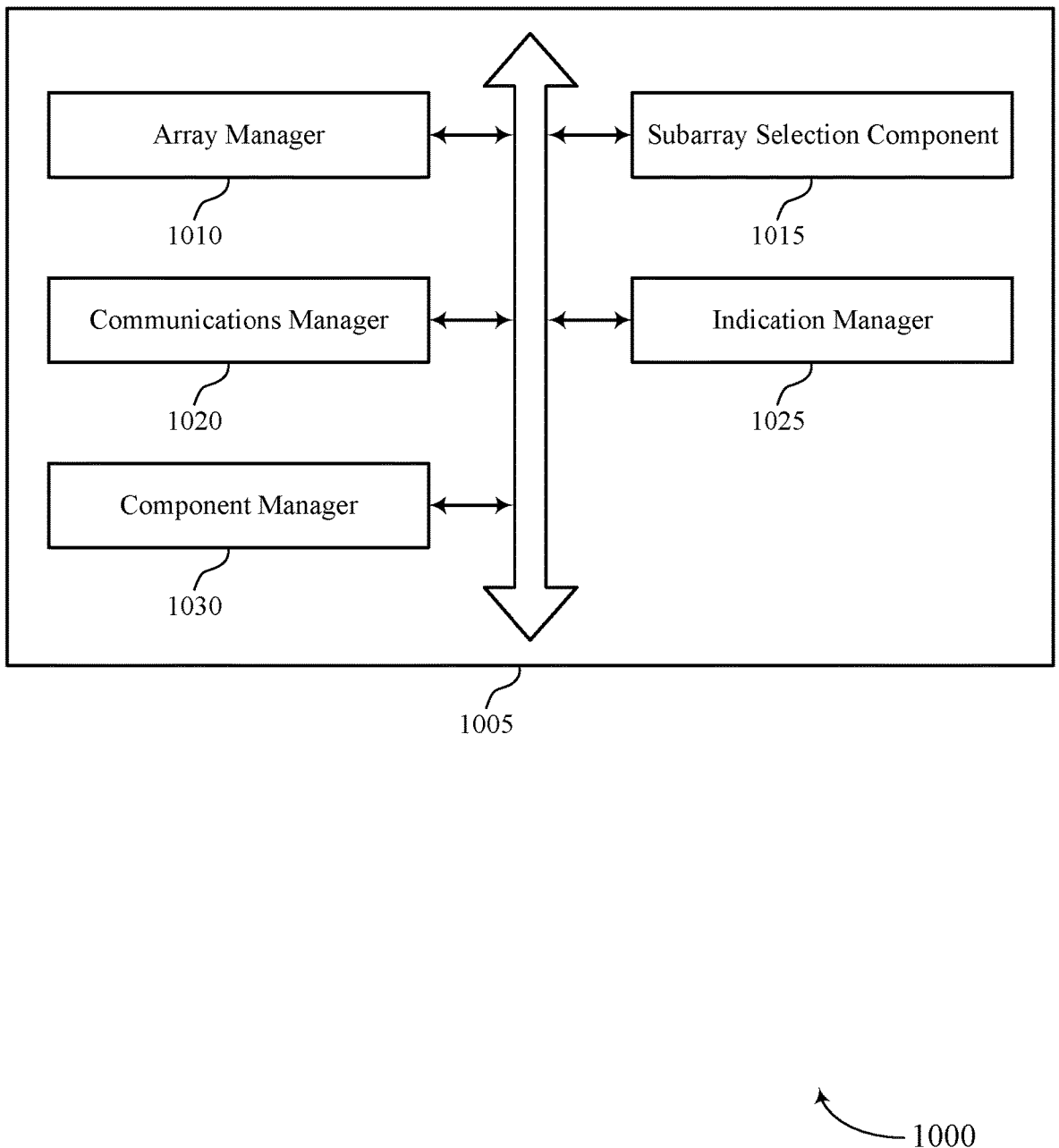
FIG. 10 shows a block diagram of an antenna manager that supports techniques for antenna subset selection in upper mmW bands in accordance with aspects of the present disclosure.

FIG. 10 shows a block diagram 1000 of an antenna manager 1005 that supports techniques for antenna subset selection in upper mmW bands in accordance with aspects of the present disclosure. The antenna manager 1005 may be an example of aspects of an antenna manager 815, an antenna manager 915, or an antenna manager 1110 described herein. The antenna manager 1005 may include an array manager 1010, a subarray selection component 1015, a communications manager 1020, an indication manager 1025, and a component manager 1030. Each of these modules may communicate, directly or indirectly, with one another (e.g., via one or more buses).

The array manager 1010 may identify an antenna array including a set of antenna elements, the antenna array used for communicating over a link with a second wireless device. Additionally or alternatively, the array manager 1010 may identify an antenna array and a configuration of one or more RF components associated with the antenna array, the antenna array including a set of antenna elements. In some cases, the first wireless device includes a UE 115, a CPE, a relay node, a smart repeater with a decode and forward capability, a dumb repeater with an amplify and forward capability, a router, an IAB node, or a combination thereof. In some cases, the second wireless device includes a base station 105, a backhaul node, an IAB node, or a combination thereof. In some cases, the antenna array is configured to operate at carrier frequencies greater than 52.6 GHz (e.g., upper mmW bands).

The subarray selection component 1015 may select, from the set of antenna elements, a first subset of antenna elements for uplink transmissions and a second subset of antenna elements for downlink transmissions, the selection being based on one or more operational parameters associated with power and link performance, where a QCL configuration for signals transmitted over the link is unchanged after the selection.

In some examples, the subarray selection component 1015 may select, from the set of antenna elements, a first subset of antenna elements for uplink transmissions and a second subset of antenna elements for downlink transmissions, the selection being based on the configuration of the one or more RF components. In some examples, the subarray selection component 1015 may identify a first number of antenna elements from the set of antenna elements for communicating with the second wireless device during a first time interval.

In some examples, the subarray selection component 1015 may select a second number of antenna elements that is less than the first number of antenna elements, where the second number of antenna elements are used for communicating over the link with the second wireless device during a second time interval. In some examples, the subarray selection component 1015 may select a third number of antenna elements that is less than the second number of antenna elements.

In some examples, the subarray selection component 1015 may select the first subset of antenna elements and the second subset of antenna elements is based on an equivalent isotropic radiated power threshold, an effective isotropic sensitivity threshold, or a combination thereof. In some examples, the subarray selection component 1015 may select the first subset of antenna elements and the second subset of antenna elements is based on a RF spectrum bandwidth supported by each of the one or more RF components.

In some cases, the third number of antenna elements form a planar array pattern, a linear array pattern, or a combination thereof. In some cases, the first time interval and the second time interval each include one or more symbols, one or more slots, one or more subframes, or a combination thereof. In some cases, the one or more operational parameters include a power consumption level at the first wireless device, a thermal overhead level of the first wireless device, a communication rate threshold, a transmission reliability threshold, or a combination thereof. In some cases, the first subset of antennas is different from the second subset of antenna elements.

The communications manager 1020 may communicate over the link with the second wireless device based on the selected first subset of antenna elements and the second subset of antenna elements. In some examples, the communications manager 1020 may receive, from the second wireless device, a transmission having an adjusted transmission power, adjusted transmission rate, or a combination thereof, based on the transmitted indication that the number of antenna elements used by the first wireless device has changed. In some examples, the communications manager 1020 may communicate over the link with the second wireless device during a third time interval using the third number of antenna elements.

The indication manager 1025 may transmit, to the second wireless device, an indication that a number of antenna elements used by the first wireless device has changed based on the selected first subset of antenna elements and the second subset of antenna elements. In some examples, the indication manager 1025 may receive, from the second wireless device, an indication of a number of antenna elements to use for communicating over the link based on antenna elements used at the second wireless device, where selecting the first subset of antenna elements and the second subset of antenna elements is based on the received indication.

The component manager 1030 may identify a set of one or more PAs at the first wireless device, where selecting the first subset of antenna elements for uplink transmissions is based on the identified set of one or more PAs. In some examples, the component manager 1030 may identify a set of one or more LNAs at the first wireless device, where selecting the second subset of antenna elements for downlink transmission is based on the identified set of one or more LNAs. In some cases, a first PA of the set of one or more PAs is configured to operate with a first range of RF spectrum bands. In some cases, a second PA of the set of one or more PAs is configured to operate in a second range of RF spectrum bands different from the first range. In some cases, an LNA of the set of one or more LNAs is configured to operate in a third range of RF spectrum bands that includes at least the first range and the second range. In some cases, the configuration of the one or more RF components includes a quantity of PAs and a quantity of LNAs.

Figure 11:
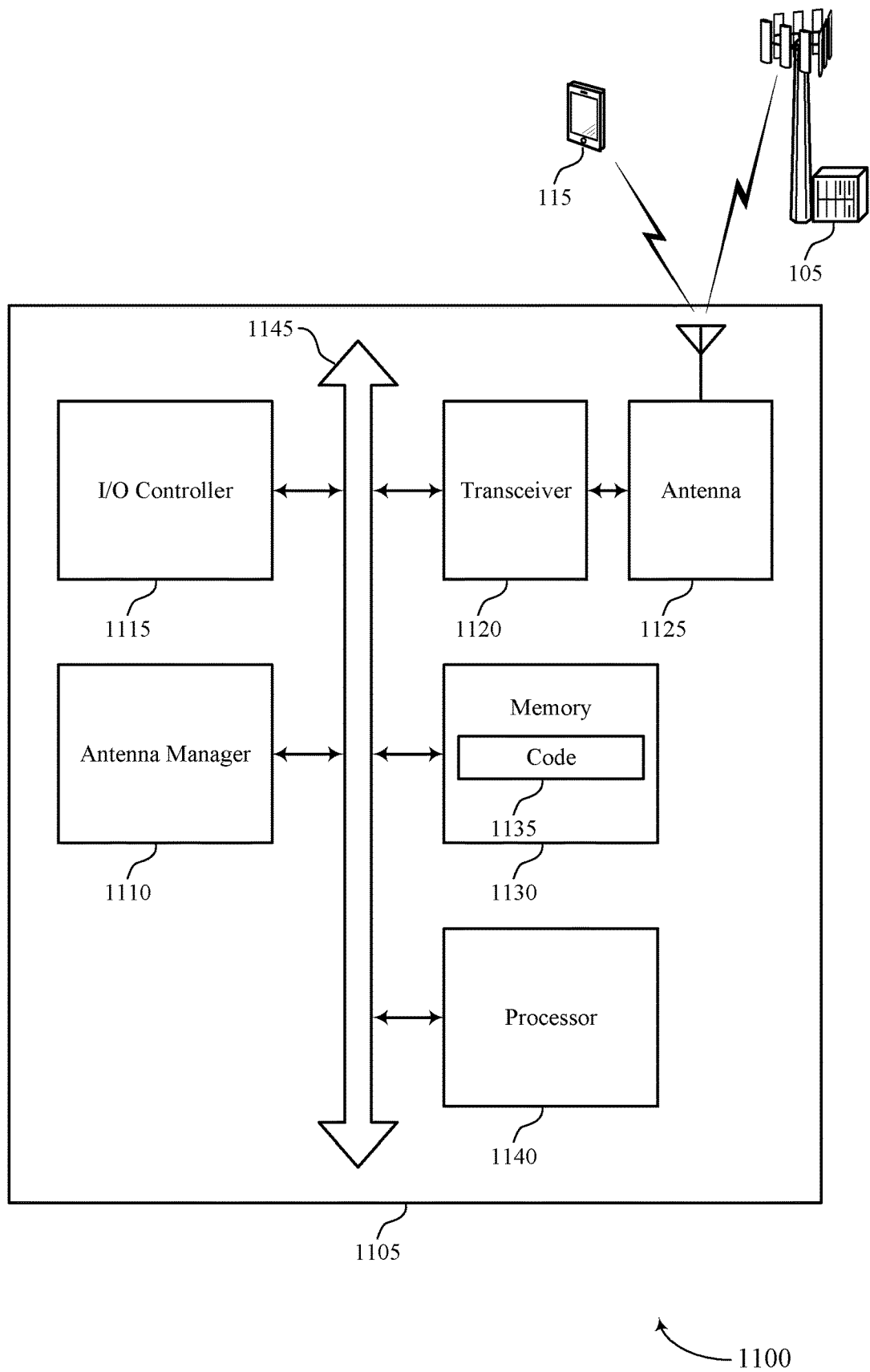
FIG. 11 shows a diagram of a system including a device that supports techniques for antenna subset selection in upper mmW bands in accordance with aspects of the present disclosure.

FIG. 11 shows a diagram of a system 1100 including a device 1105 that supports techniques for antenna subset selection in upper mmW bands in accordance with aspects of the present disclosure. The device 1105 may be an example of or include the components of device 805, device 905, or a wireless device (e.g., a UE 115, a CPE, a relay node, a smart repeater with a decode and forward capability, a dumb repeater with an amplify and forward capability, a router, an IAB node, or the like) as described herein. The device 1105 may include components for bi-directional voice and data communications including components for transmitting and receiving communications, including an antenna manager 1110, an I/O controller 1115, a transceiver 1120, an antenna 1125, memory 1130, and a processor 1140. These components may be in electronic communication via one or more buses (e.g., bus 1145).

The antenna manager 1110 may identify an antenna array including a set of antenna elements, the antenna array used for communicating over a link with a second wireless device, select, from the set of antenna elements, a first subset of antenna elements for uplink transmissions and a second subset of antenna elements for downlink transmissions, the selection being based on one or more operational parameters associated with power and link performance, where a QCL configuration for signals transmitted over the link is unchanged after the selection, and communicate over the link with the second wireless device based on the selected first subset of antenna elements and the second subset of antenna elements.

The antenna manager 1110 may also identify an antenna array and a configuration of one or more RF components associated with the antenna array, the antenna array including a set of antenna elements, select, from the set of antenna elements, a first subset of antenna elements for uplink transmissions and a second subset of antenna elements for downlink transmissions, the selection being based on the configuration of the one or more RF components, and communicate over a link with a second wireless device based on the selected first subset of antenna elements and the second subset of antenna elements.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for antenna subset selection in upper mmW bands).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

By including or configuring the antenna manager 1110 in accordance with examples as described herein, the device 1105 may support techniques for dynamically selecting antenna subarrays to communicate in upper mmW RF bands while efficiently managing power, link budget, and component constraints. For example, the device 1105 may use different antenna subarrays for uplink or downlink communications, which may reduce power consumption and thermal output at the device 1105. The device 1105 may indicate a change in array size, enabling modification of communication parameters and thereby increasing overall communication efficiency in the system.

Figure 12:
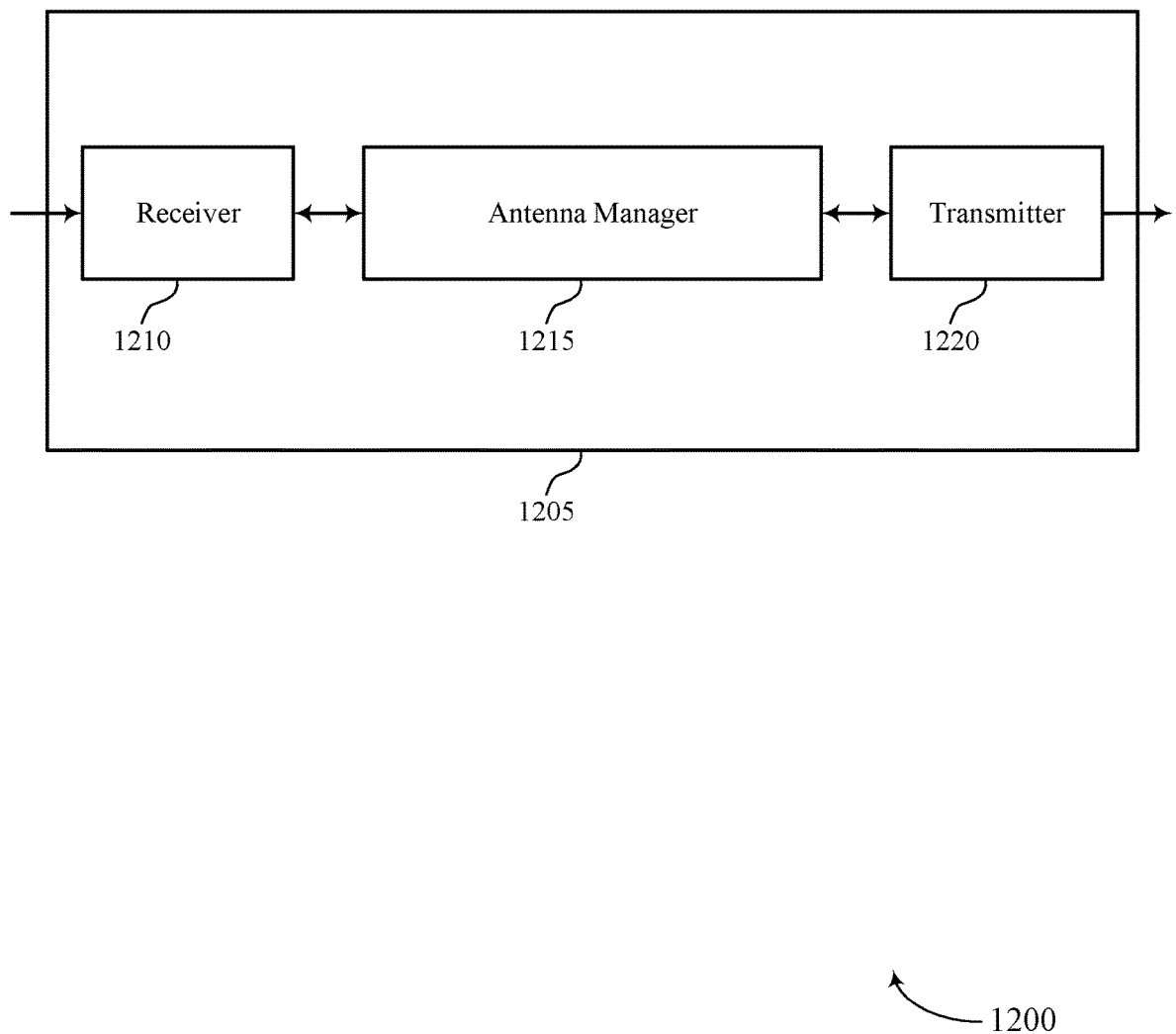
FIGS. 12 and 13 show block diagrams of devices that support techniques for antenna subset selection in upper mmW bands in accordance with aspects of the present disclosure.

FIG. 12 shows a block diagram 1200 of a device 1205 that supports techniques for antenna subset selection in upper mmW bands in accordance with aspects of the present disclosure. The device 1205 may be an example of aspects of a wireless device, such as a base station 105, as described herein. The device 1205 may include a receiver 1210, an antenna manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for antenna subset selection in upper mmW bands, etc.). Information may be passed on to other components of the device 1205. The receiver 1210 may be an example of aspects of the transceiver 1520 described with reference to FIG. 15. The receiver 1210 may utilize a single antenna or a set of antennas.

The antenna manager 1215 may communicate over a link with a second wireless device. In some cases, the antenna manager 1215 may receive, from the second wireless device, an indication that a number of antenna elements used by the second wireless device has changed based on the second wireless device selecting a first subset of antenna elements for uplink transmissions and a second subset of antenna elements for downlink transmissions, where a QCL configuration for transmitting signals over the link remains unchanged after the selection. In some examples, the antenna manager 1215 may adjust a transmission power, a transmission rate, or a combination thereof, based on the received indication that the number of antenna elements used by the second wireless device has changed and communicate over the link with the second wireless device using the adjusted transmission power, the adjusted transmission rate, or a combination thereof, based on the received indication that the number of antenna elements used by the second wireless device has changed. The antenna manager 1215 may be an example of aspects of the antenna manager 1510 described herein.

The antenna manager 1215, or its sub-components, may be implemented in hardware, code (e.g., software or firmware) executed by a processor, or any combination thereof. If implemented in code executed by a processor, the functions of the antenna manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The antenna manager 1215, or its sub-components, may be physically located at various positions, including being distributed such that portions of functions are implemented at different physical locations by one or more physical components. In some examples, the antenna manager 1215, or its sub-components, may be a separate and distinct component in accordance with various aspects of the present disclosure. In some examples, the antenna manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

By including or configuring the antenna manager 1215 in accordance with examples as described herein, the device 1205 (e.g., a processor controlling or otherwise coupled to the receiver 1210, the transmitter 1220, the antenna manager 1215, or a combination thereof) may support techniques for dynamically selecting subsets of antenna elements within an array. The device 1205 may adjust one or more communication parameters based on a received indication of a change in array size at another device. For instance, the device 1205 may reduce a transmission power or a transmission rate, which in turn may reduce power consumption and improve efficient use of communication resources at the device 1205.

Figure 13:
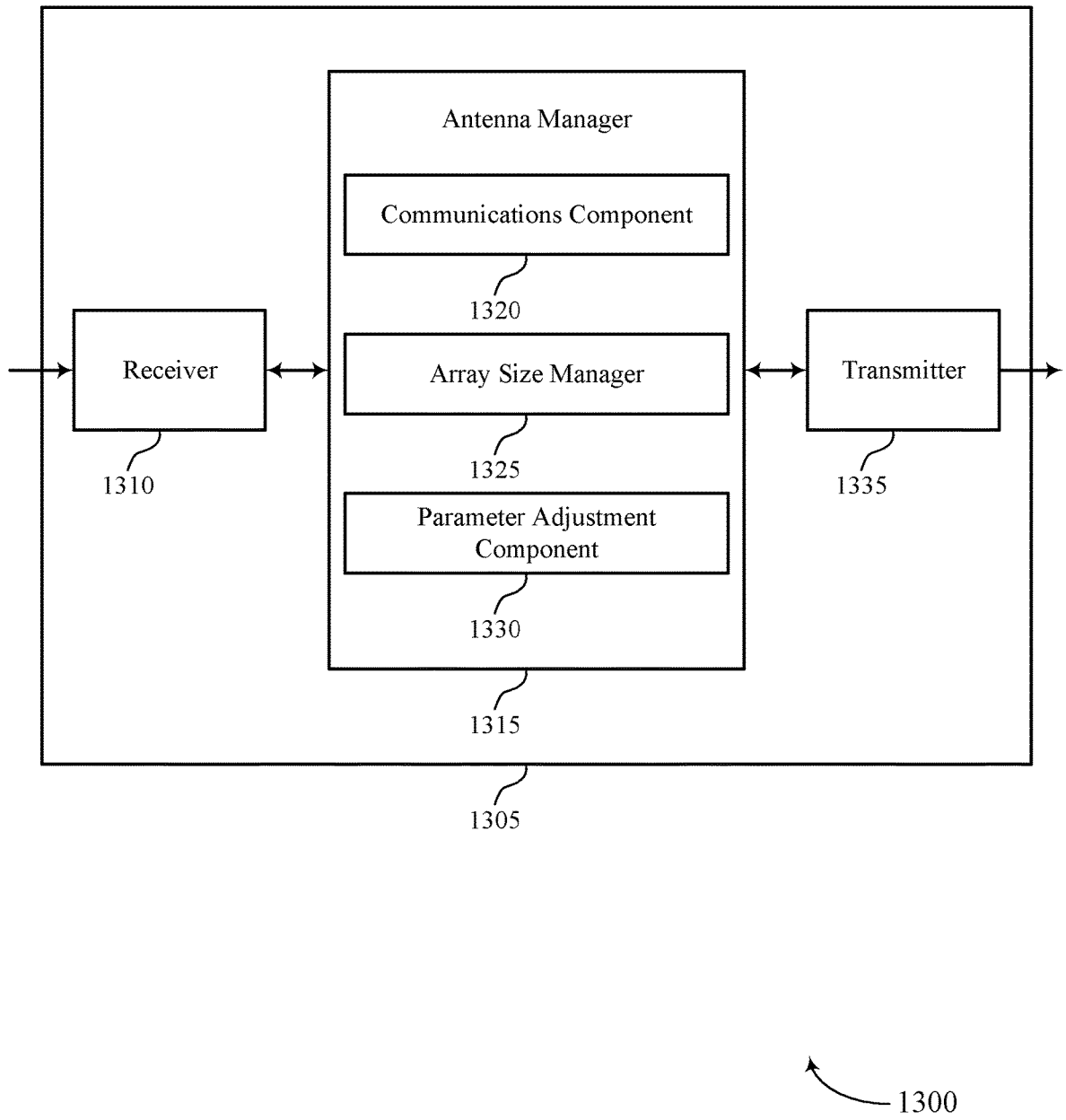

FIG. 13 shows a block diagram 1300 of a device 1305 that supports techniques for antenna subset selection in upper mmW bands in accordance with aspects of the present disclosure. The device 1305 may be an example of aspects of a device 1205, or a wireless device (e.g., a base station 105, backhaul node, IAB node), as described herein. The device 1305 may include a receiver 1310, an antenna manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for antenna subset selection in upper mmW bands, etc.). Information may be passed on to other components of the device 1305. The receiver 1310 may be an example of aspects of the transceiver 1520 described with reference to FIG. 15. The receiver 1310 may utilize a single antenna or a set of antennas.

The antenna manager 1315 may be an example of aspects of the antenna manager 1215 as described herein. The antenna manager 1315 may include a communications component 1320, an array size manager 1325, and a parameter adjustment component 1330. The antenna manager 1315 may be an example of aspects of the antenna manager 1510 described herein.

The communications component 1320 may communicate over a link with a second wireless device and communicate over the link with the second wireless device using the adjusted transmission power, the adjusted transmission rate, or a combination thereof, based on the received indication that the number of antenna elements used by the second wireless device has changed.

The array size manager 1325 may receive, from the second wireless device, an indication that a number of antenna elements used by the second wireless device has changed based on the second wireless device selecting a first subset of antenna elements for uplink transmissions and a second subset of antenna elements for downlink transmissions, where a QCL configuration for transmitting signals over the link remains unchanged after the selection.

The parameter adjustment component 1330 may adjust a transmission power, a transmission rate, or a combination thereof, based on the received indication that the number of antenna elements used by the second wireless device has changed.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
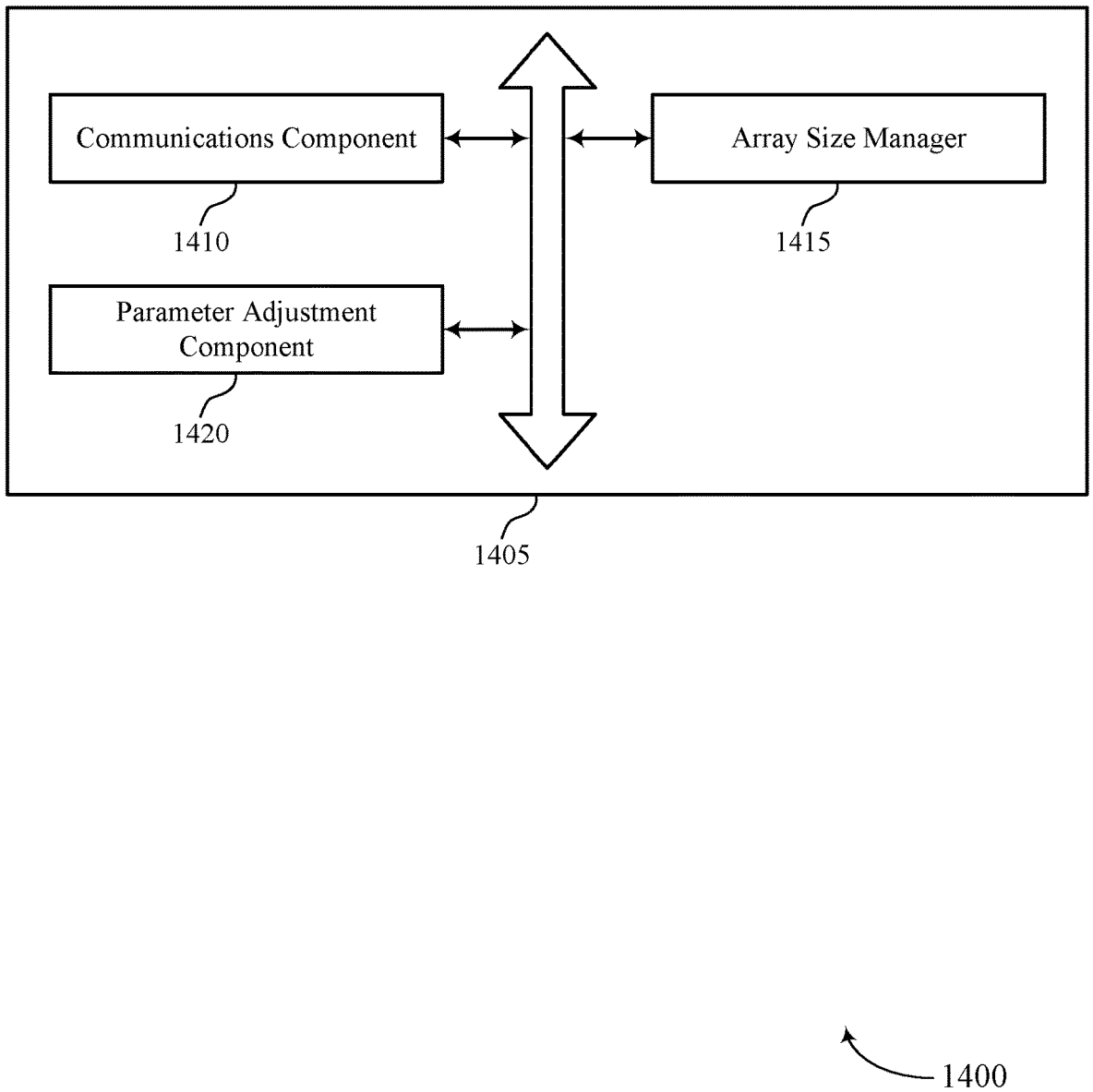
FIG. 14 shows a block diagram of an antenna manager that supports techniques for antenna subset selection in upper mmW bands in accordance with aspects of the present disclosure.

FIG. 14 shows a block diagram 1400 of an antenna manager 1405 that supports techniques for antenna subset selection in upper mmW bands in accordance with aspects of the present disclosure. The antenna manager 1405 may be an example of aspects of an antenna manager 1215, an antenna manager 1315, or an antenna manager 1510 described herein. The antenna manager 1405 may include a communications component 1410, an array size manager 1415, and a parameter adjustment component 1420. Each of these modules may communicate, directly or indirectly, with one another (e.g., via one or more buses).

The communications component 1410 may communicate over a link with a second wireless device. In some examples, the communications component 1410 may communicate over the link with the second wireless device using the adjusted transmission power, the adjusted transmission rate, or a combination thereof, based on the received indication that the number of antenna elements used by the second wireless device has changed.

In some cases, the first wireless device includes a UE 115, a CPE, a relay node, a smart repeater with a decode and forward capability, a dumb repeater with an amplify and forward capability, a router, an IAB node, or a combination thereof. In some cases, the second wireless device includes a base station 105, a backhaul node, an integrated access and backhaul node, or a combination thereof.

The array size manager 1415 may receive, from the second wireless device, an indication that a number of antenna elements used by the second wireless device has changed based on the second wireless device selecting a first subset of antenna elements for uplink transmissions and a second subset of antenna elements for downlink transmissions, where a QCL configuration for transmitting signals over the link remains unchanged after the selection. In some cases, the one or more operational parameters include a power consumption level at the first wireless device, a thermal overhead level of the first wireless device, a communication rate threshold, a transmission reliability threshold, or a combination thereof. In some cases, the number of antenna elements are configured to operate at carrier frequencies greater than 52.6 GHz (e.g., FR4, upper mmW bands).

The parameter adjustment component 1420 may adjust a transmission power, a transmission rate, or a combination thereof, based on the received indication that the number of antenna elements used by the second wireless device has changed.

Figure 15:
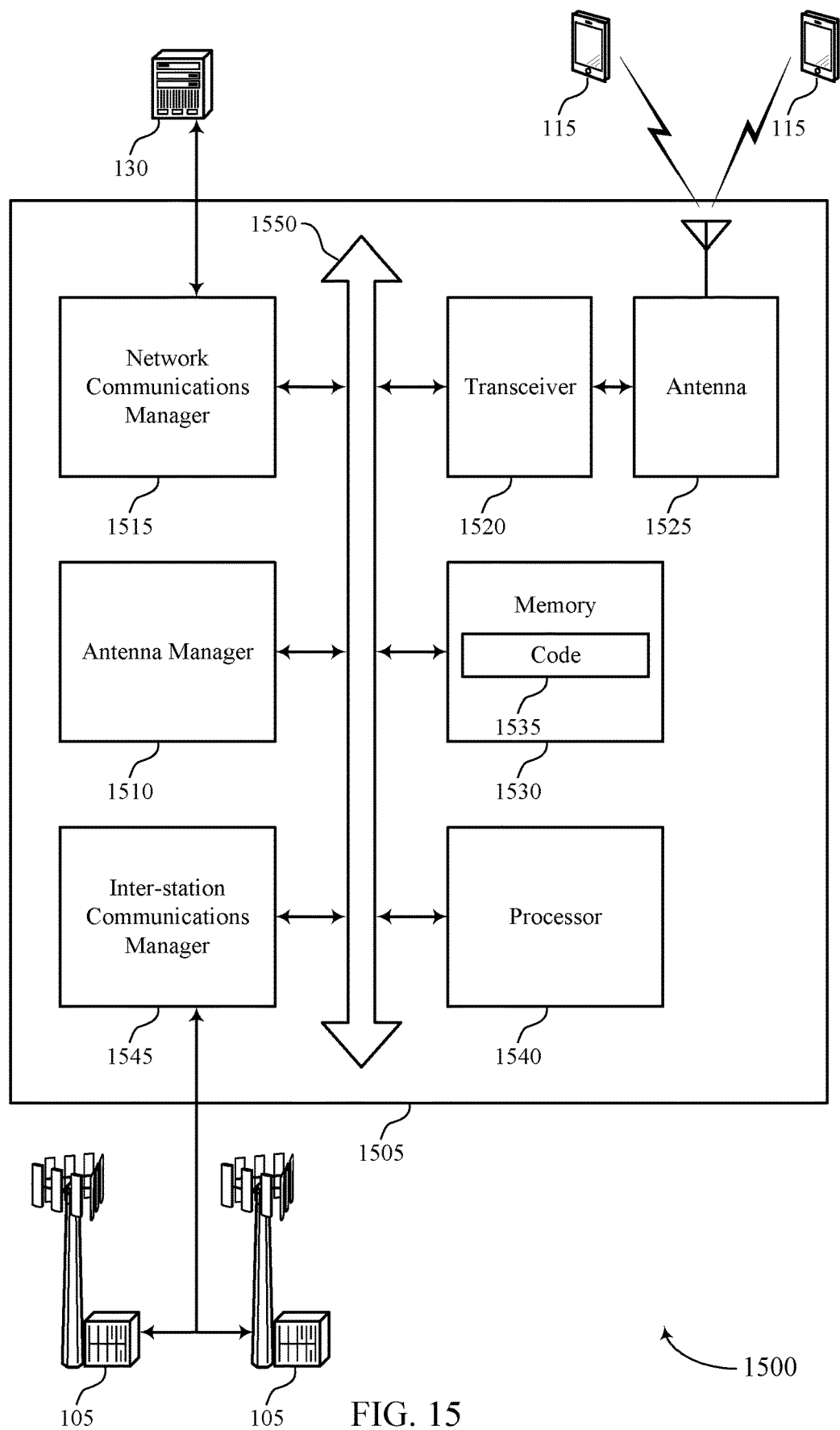
FIG. 15 shows a diagram of a system including a device that supports techniques for antenna subset selection in upper mmW bands in accordance with aspects of the present disclosure.

FIG. 15 shows a diagram of a system 1500 including a device 1505 that supports techniques for antenna subset selection in upper mmW bands in accordance with aspects of the present disclosure. The device 1505 may be an example of or include the components of device 1205, device 1305, or a wireless device (e.g., a base station 105, backhaul node, IAB node) as described herein. The device 1505 may include components for bi-directional voice and data communications including components for transmitting and receiving communications, including an antenna manager 1510, a network communications manager 1515, a transceiver 1520, an antenna 1525, memory 1530, a processor 1540, and an inter-station communications manager 1545. These components may be in electronic communication via one or more buses (e.g., bus 1550).

The antenna manager 1510 may communicate over a link with a second wireless device, communicate over the link with the second wireless device using the adjusted transmission power, the adjusted transmission rate, or a combination thereof, based on the received indication that the number of antenna elements used by the second wireless device has changed, receive, from the second wireless device, an indication that a number of antenna elements used by the second wireless device has changed based on the second wireless device selecting a first subset of antenna elements for uplink transmissions and a second subset of antenna elements for downlink transmissions, where a QCL configuration for transmitting signals over the link remains unchanged after the selection, and adjust a transmission power, a transmission rate, or a combination thereof, based on the received indication that the number of antenna elements used by the second wireless device has changed.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases the device 1505 may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting techniques for antenna subset selection in upper mmW bands).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

By including or configuring the antenna manager 1510 in accordance with examples as described herein, the device 1505 may support techniques for dynamically selecting antenna subarrays to communicate in upper mmW RF bands while efficiently managing power, link budget, and component constraints. For example, the device 1505 may modify communication parameters according to a received indication of a change in antenna subarray size, thereby increasing overall communication efficiency in the system.

Figure 16:
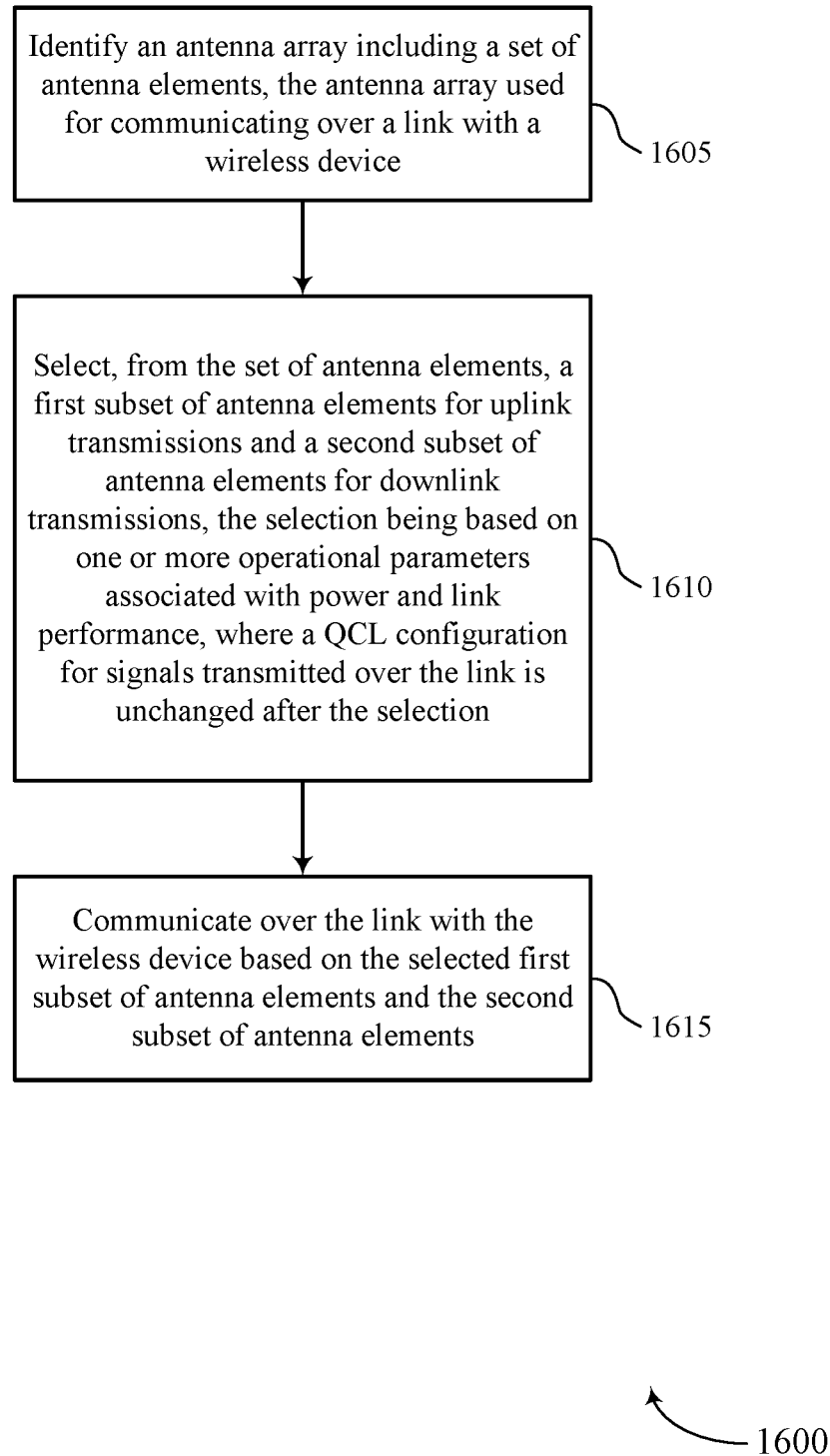
FIGS. 16 through 20 show flowcharts illustrating methods that support techniques for antenna subset selection in upper mmW bands in accordance with aspects of the present disclosure.

FIG. 16 shows a flowchart illustrating a method 1600 that supports techniques for antenna subset selection in upper mmW bands in accordance with aspects of the present disclosure. The operations of method 1600 may be implemented by a first wireless device (e.g., a UE 115, a CPE, a relay node, a smart repeater with a decode and forward capability, a dumb repeater with an amplify and forward capability, a router, an IAB node, or the like) or its components as described herein. For example, the operations of method 1600 may be performed by an antenna manager as described with reference to FIGS. 8 through 11. In some examples, a wireless device may execute a set of instructions to control the functional elements of the wireless to perform the functions described herein. Additionally or alternatively, a wireless device may perform aspects of the functions described herein using special-purpose hardware.

At 1605, the first wireless device may identify an antenna array including a set of antenna elements, the antenna array used for communicating over a link with a second wireless device. The operations of 1605 may be performed according to the methods described herein. In some examples, aspects of the operations of 1605 may be performed by an array manager as described with reference to FIGS. 8 through 11.

At 1610, the first wireless device may select, from the set of antenna elements, a first subset of antenna elements for uplink transmissions and a second subset of antenna elements for downlink transmissions, the selection being based on one or more operational parameters associated with power and link performance, where a QCL configuration for signals transmitted over the link is unchanged after the selection. The operations of 1610 may be performed according to the methods described herein. In some examples, aspects of the operations of 1610 may be performed by a subarray selection component as described with reference to FIGS. 8 through 11.

At 1615, the first wireless device may communicate over the link with the second wireless device based on the selected first subset of antenna elements and the second subset of antenna elements. The operations of 1615 may be performed according to the methods described herein. In some examples, aspects of the operations of 1615 may be performed by a communications manager as described with reference to FIGS. 8 through 11.

Figure 17:
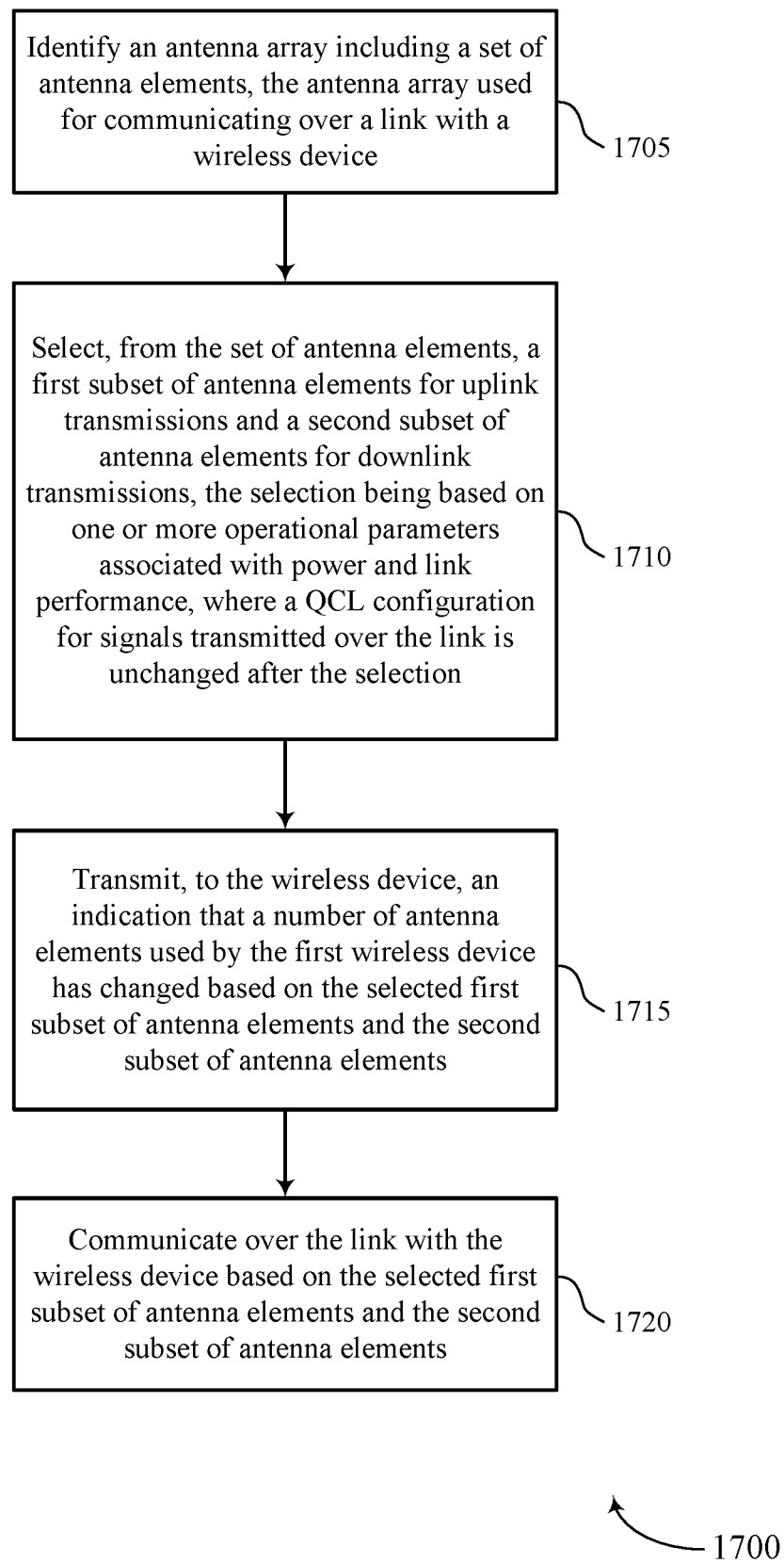

FIG. 17 shows a flowchart illustrating a method 1700 that supports techniques for antenna subset selection in upper mmW bands in accordance with aspects of the present disclosure. The operations of method 1700 may be implemented by a first wireless device (e.g., a UE 115, a CPE, a relay node, a repeater, a router, an IAB node, or the like) or its components as described herein. For example, the operations of method 1700 may be performed by an antenna manager as described with reference to FIGS. 8 through 11. In some examples, a wireless device may execute a set of instructions to control the functional elements of the wireless device to perform the functions described herein. Additionally or alternatively, a wireless device may perform aspects of the functions described herein using special-purpose hardware.

At 1705, the first wireless device may identify an antenna array including a set of antenna elements, the antenna array used for communicating over a link with a second wireless device. The operations of 1705 may be performed according to the methods described herein. In some examples, aspects of the operations of 1705 may be performed by an array manager as described with reference to FIGS. 8 through 11.

At 1710, the first wireless device may select, from the set of antenna elements, a first subset of antenna elements for uplink transmissions and a second subset of antenna elements for downlink transmissions, the selection being based on one or more operational parameters associated with power and link performance, where a QCL configuration for signals transmitted over the link is unchanged after the selection. The operations of 1710 may be performed according to the methods described herein. In some examples, aspects of the operations of 1710 may be performed by a subarray selection component as described with reference to FIGS. 8 through 11.

At 1715, the first wireless device may transmit, to the second wireless device, an indication that a number of antenna elements used by the first wireless device has changed based on the selected first subset of antenna elements and the second subset of antenna elements. The operations of 1715 may be performed according to the methods described herein. In some examples, aspects of the operations of 1715 may be performed by an indication manager as described with reference to FIGS. 8 through 11.

At 1720, the first wireless device may communicate over the link with the second wireless device based on the selected first subset of antenna elements and the second subset of antenna elements. The operations of 1720 may be performed according to the methods described herein. In some examples, aspects of the operations of 1720 may be performed by a communications manager as described with reference to FIGS. 8 through 11.

Figure 18:
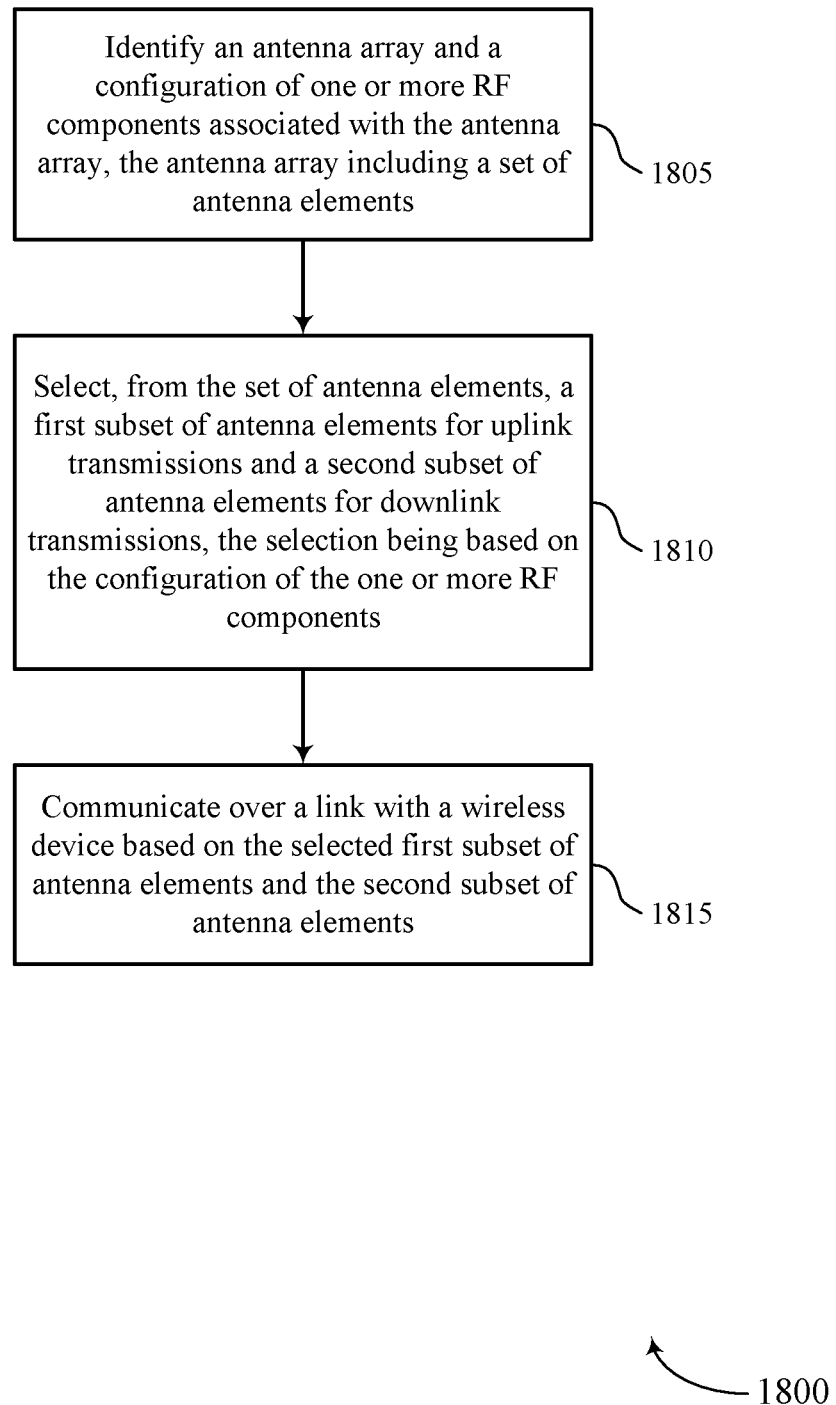

FIG. 18 shows a flowchart illustrating a method 1800 that supports techniques for antenna subset selection in upper mmW bands in accordance with aspects of the present disclosure. The operations of method 1800 may be implemented by a first wireless device (e.g., a UE 115, a CPE, a relay node, a smart repeater with a decode and forward capability, a dumb repeater with an amplify and forward capability, a router, an IAB node, or the like) or its components as described herein. For example, the operations of method 1800 may be performed by an antenna manager as described with reference to FIGS. 8 through 11. In some examples, a wireless device may execute a set of instructions to control the functional elements of the wireless device to perform the functions described herein. Additionally or alternatively, a wireless device may perform aspects of the functions described herein using special-purpose hardware.

At 1805, the first wireless device may identify an antenna array and a configuration of one or more RF components associated with the antenna array, the antenna array including a set of antenna elements. The operations of 1805 may be performed according to the methods described herein. In some examples, aspects of the operations of 1805 may be performed by an array manager as described with reference to FIGS. 8 through 11.

At 1810, the first wireless device may select, from the set of antenna elements, a first subset of antenna elements for uplink transmissions and a second subset of antenna elements for downlink transmissions, the selection being based on the configuration of the one or more RF components. The operations of 1810 may be performed according to the methods described herein. In some examples, aspects of the operations of 1810 may be performed by a subarray selection component as described with reference to FIGS. 8 through 11.

At 1815, the first wireless device may communicate over a link with a second wireless device based on the selected first subset of antenna elements and the second subset of antenna elements. The operations of 1815 may be performed according to the methods described herein. In some examples, aspects of the operations of 1815 may be performed by a communications manager as described with reference to FIGS. 8 through 11.

Figure 19:
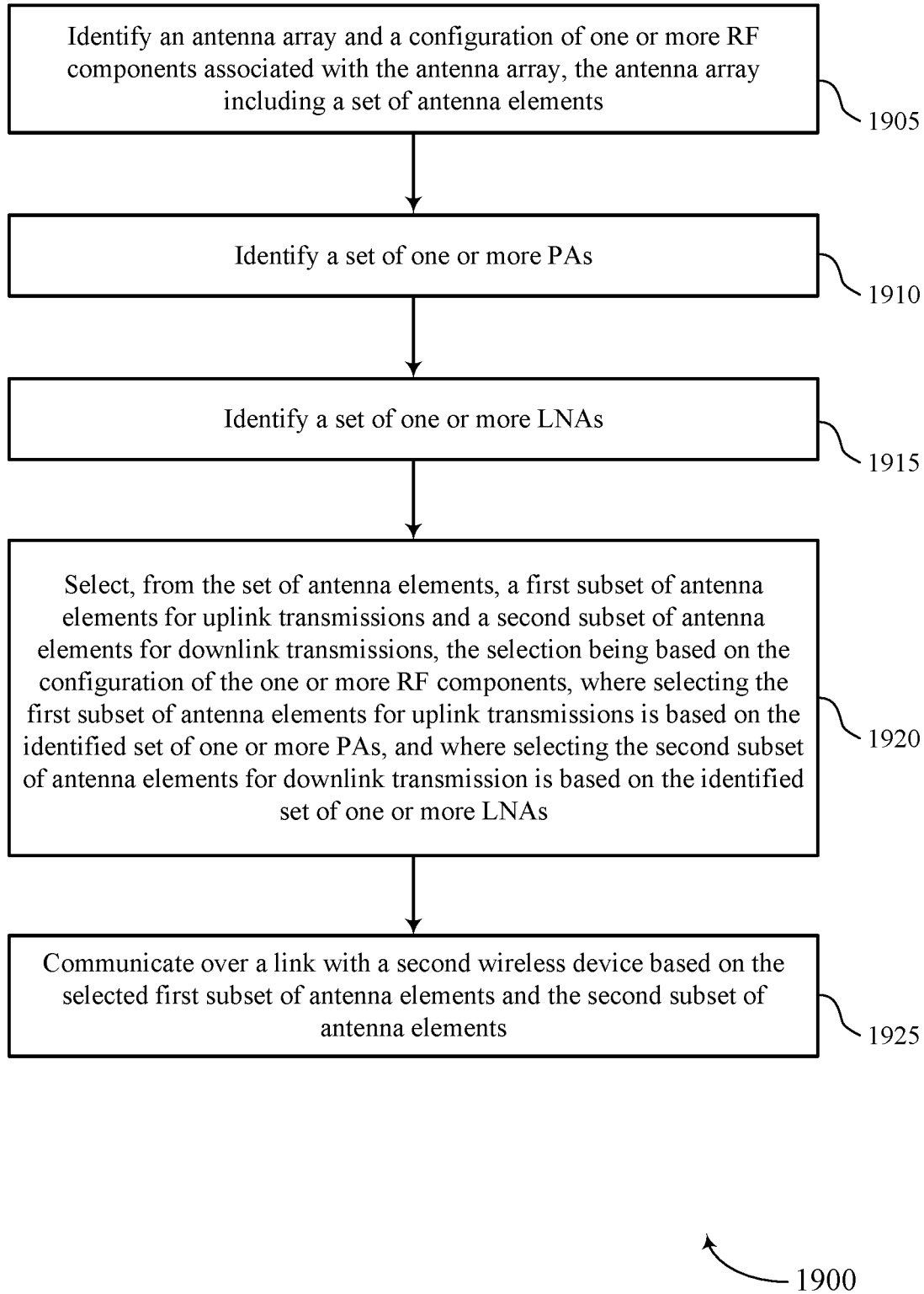

FIG. 19 shows a flowchart illustrating a method 1900 that supports techniques for antenna subset selection in upper mmW bands in accordance with aspects of the present disclosure. The operations of method 1900 may be implemented by a first wireless device (e.g., a UE 115, a CPE, a relay node, a smart repeater with a decode and forward capability, a dumb repeater with an amplify and forward capability, a router, an IAB node, or the like) or its components as described herein. For example, the operations of method 1900 may be performed by an antenna manager as described with reference to FIGS. 8 through 11. In some examples, a wireless device may execute a set of instructions to control the functional elements of the wireless device to perform the functions described herein. Additionally or alternatively, a wireless device may perform aspects of the functions described herein using special-purpose hardware.

At 1905, the first wireless device may identify an antenna array and a configuration of one or more RF components associated with the antenna array, the antenna array including a set of antenna elements. The operations of 1905 may be performed according to the methods described herein. In some examples, aspects of the operations of 1905 may be performed by an array manager as described with reference to FIGS. 8 through 11.

At 1910, the first wireless device may identify a set of one or more PAs at the first wireless device. The operations of 1910 may be performed according to the methods described herein. In some examples, aspects of the operations of 1910 may be performed by a component manager as described with reference to FIGS. 8 through 11.

At 1915, the first wireless device may identify a set of one or more LNAs at the first wireless device. The operations of 1915 may be performed according to the methods described herein. In some examples, aspects of the operations of 1915 may be performed by a component manager as described with reference to FIGS. 8 through 11.

At 1920, the first wireless device may select, from the set of antenna elements, a first subset of antenna elements for uplink transmissions and a second subset of antenna elements for downlink transmissions, the selection being based on the configuration of the one or more RF components. In some examples, selecting the first subset of antenna elements for uplink transmissions is based on the identified set of one or more PAs and selecting the second subset of antenna elements for downlink transmission is based on the identified set of one or more LNAs. The operations of 1920 may be performed according to the methods described herein. In some examples, aspects of the operations of 1920 may be performed by a subarray selection component as described with reference to FIGS. 8 through 11.

At 1925, the first wireless device may communicate over a link with a second wireless device based on the selected first subset of antenna elements and the second subset of antenna elements. The operations of 1925 may be performed according to the methods described herein. In some examples, aspects of the operations of 1925 may be performed by a communications manager as described with reference to FIGS. 8 through 11.

Figure 20:
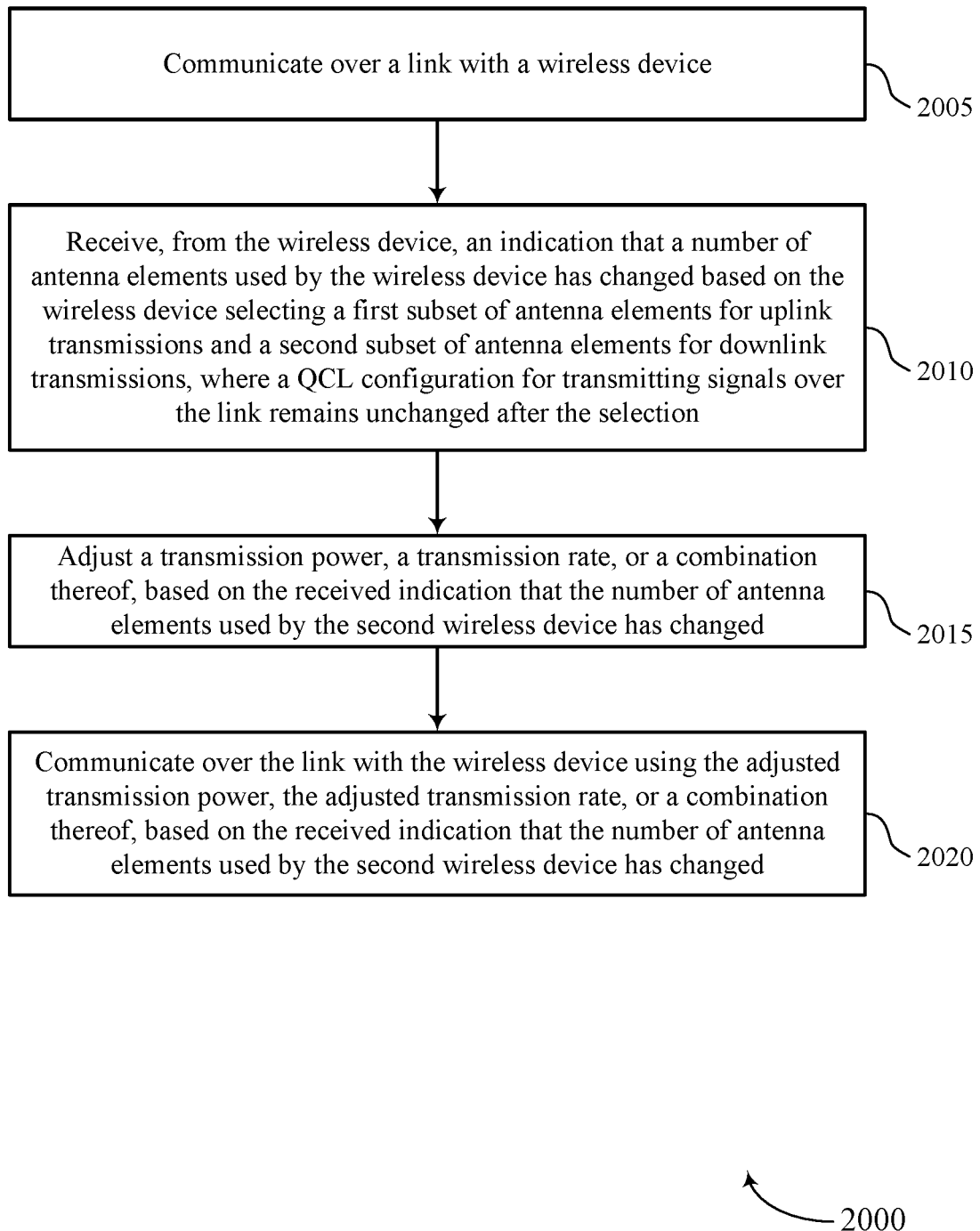

FIG. 20 shows a flowchart illustrating a method 2000 that supports techniques for antenna subset selection in upper mmW bands in accordance with aspects of the present disclosure. The operations of method 2000 may be implemented by a first wireless device (e.g., a base station 105, a backhaul node, an IAB node) or its components as described herein. For example, the operations of method 2000 may be performed by an antenna manager as described with reference to FIGS. 12 through 15. In some examples, a wireless device may execute a set of instructions to control the functional elements of the wireless device to perform the functions described herein. Additionally or alternatively, a wireless device may perform aspects of the functions described herein using special-purpose hardware.

At 2005, the first wireless device may communicate over a link with a second wireless device. The operations of 2005 may be performed according to the methods described herein. In some examples, aspects of the operations of 2005 may be performed by a communications component as described with reference to FIGS. 12 through 15.

At 2010, the first wireless device may receive, from the second wireless device, an indication that a number of antenna elements used by the second wireless device has changed based on the second wireless device selecting a first subset of antenna elements for uplink transmissions and a second subset of antenna elements for downlink transmissions, where a QCL configuration for transmitting signals over the link remains unchanged after the selection. The operations of 2010 may be performed according to the methods described herein. In some examples, aspects of the operations of 2010 may be performed by an array size manager as described with reference to FIGS. 12 through 15.

At 2015, the first wireless device may adjust a transmission power, a transmission rate, or a combination thereof, based on the received indication that the number of antenna elements used by the second wireless device has changed. The operations of 2015 may be performed according to the methods described herein. In some examples, aspects of the operations of 2015 may be performed by a parameter adjustment component as described with reference to FIGS. 12 through 15.

At 2020, the first wireless device may communicate over the link with the second wireless device using the adjusted transmission power, the adjusted transmission rate, or a combination thereof, based on the received indication that the number of antenna elements used by the second wireless device has changed. The operations of 2020 may be performed according to the methods described herein. In some examples, aspects of the operations of 2020 may be performed by a communications component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first wireless device, comprising: identifying an antenna array and a configuration of one or more radio frequency components associated with the antenna array, the antenna array comprising a plurality of antenna elements; selecting, from the plurality of antenna elements, a first subset of antenna elements for uplink transmissions and a second subset of antenna elements for downlink transmissions, the selection being based at least in part on the configuration of the one or more radio frequency components; and communicating over a link with a second wireless device based at least in part on the selected first subset of antenna elements and the second subset of antenna elements.

Aspect 2: The method of aspect 1, wherein identifying the configuration of the one or more radio frequency components associated with the antenna array comprises: identifying a set of one or more power amplifiers at the first wireless device, wherein selecting the first subset of antenna elements for uplink transmissions is based at least in part on the identified set of one or more power amplifiers; and identifying a set of one or more low-noise amplifiers at the first wireless device, wherein selecting the second subset of antenna elements for downlink transmission is based at least in part on the identified set of one or more low-noise amplifiers.

Aspect 3: The method of aspect 2, wherein a first power amplifier of the set of one or more power amplifiers is configured to operate with a first range of radio frequency spectrum bands; a second power amplifier of the set of one or more power amplifiers is configured to operate in a second range of radio frequency spectrum bands different from the first range; and a low-noise amplifier of the set of one or more low-noise amplifiers is configured to operate in a third range of radio frequency spectrum bands that comprises at least the first range and the second range.

Aspect 4: The method of any of aspects 1 through 3, further comprising: receiving, from the second wireless device, an indication of a number of antenna elements to use for communicating over the link based at least in part on antenna elements used at the second wireless device, wherein selecting the first subset of antenna elements and the second subset of antenna elements is based at least in part on the received indication.

Aspect 5: The method of any of aspects 1 through 4, wherein selecting the first subset of antenna elements and the second subset of antenna elements is based at least in part on an equivalent isotropic radiated power threshold, an effective isotropic sensitivity threshold, or a combination thereof.

Aspect 6: The method of any of aspects 1 through 5, wherein selecting the first subset of antenna elements and the second subset of antenna elements is based at least in part on a radio frequency spectrum bandwidth supported by each of the one or more radio frequency components.

Aspect 7: The method of any of aspects 1 through 6, wherein the first subset of antenna elements is different from the second subset of antenna elements.

Aspect 8: The method of any of aspects 1 through 7, wherein the configuration of the one or more radio frequency components comprises a quantity of power amplifiers and a quantity of low-noise amplifiers.

Aspect 9: The method of any of aspects 1 through 8, wherein the first wireless device comprises a user equipment, a customer premises equipment, a relay node, a smart repeater with a decode and forward capability, a dumb repeater with an amplify and forward capability, a router, an integrated access and backhaul node, or a combination thereof.

Aspect 10: The method of any of aspects 1 through 9, wherein the second wireless device comprises a base station, a backhaul node, an integrated access and backhaul node, or a combination thereof.

Aspect 11: The method of any of aspects 1 through 10, wherein the antenna array is configured to operate at carrier frequencies greater than 52.6 gigahertz.

Aspect 12: A method for wireless communication at a first wireless device, comprising: communicating over a link with a second wireless device; receiving, from the second wireless device, an indication that a number of antenna elements used by the second wireless device has changed based at least in part on the second wireless device selecting a first subset of antenna elements for uplink transmissions and a second subset of antenna elements for downlink transmissions, wherein a quasi co-location configuration for transmitting signals over the link remains unchanged after the selection; adjusting a transmission power, a transmission rate, or a combination thereof, based at least in part on the received indication that the number of antenna elements used by the second wireless device has changed; and communicating over the link with the second wireless device using the adjusted transmission power, the adjusted transmission rate, or a combination thereof, based at least in part on the received indication that the number of antenna elements used by the second wireless device has changed.

Aspect 13: The method of aspect 12, wherein the first wireless device comprises a user equipment, a customer premises equipment, a relay node, a smart repeater with a decode and forward capability, a dumb repeater with an amplify and forward capability, a router, an integrated access and backhaul node, or a combination thereof.

Aspect 14: The method of any of aspects 12 through 13, wherein the second wireless device comprises a base station, a backhaul node, an integrated access and backhaul node, or a combination thereof.

Aspect 15: The method of any of aspects 12 through 14, wherein the number of antenna elements are configured to operate at carrier frequencies greater than 52.6 gigahertz.

Aspect 16: An apparatus for wireless communication at a first wireless device, comprising a processor; memory coupled with the processor; and instructions stored in the memory and executable by the processor to cause the apparatus to perform a method of any of aspects 1 through 11.

Aspect 17: An apparatus for wireless communication at a first wireless device, comprising at least one means for performing a method of any of aspects 1 through 11.

Aspect 18: A non-transitory computer-readable medium storing code for wireless communication at a first wireless device, the code comprising instructions executable by a processor to perform a method of any of aspects 1 through 11.

Aspect 19: An apparatus for wireless communication at a first wireless device, comprising a processor; memory coupled with the processor; and instructions stored in the memory and executable by the processor to cause the apparatus to perform a method of any of aspects 12 through 15.

Aspect 20: An apparatus for wireless communication at a first wireless device, comprising at least one means for performing a method of any of aspects 12 through 15.

Aspect 21: A non-transitory computer-readable medium storing code for wireless communication at a first wireless device, the code comprising instructions executable by a processor to perform a method of any of aspects 12 through 15.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
    identifying an antenna array and a configuration of one or more radio frequency components associated with the antenna array, the antenna array comprising a plurality of antenna elements used for communicating over a link with a second wireless device;
    identifying a first quantity of antenna elements from the plurality of antenna elements for communicating with the second wireless device during a first time interval;
    selecting, from the plurality of antenna elements, a second quantity of antenna elements that is less than the first quantity of antenna elements at a second time interval, the second quantity of antenna elements comprising a first subset of antenna elements for uplink transmissions and a second subset of antenna elements for downlink receptions such that a direction of communications over the link remains the same for a time period after the selection, the selection being based at least in part on the configuration of the one or more radio frequency components and in accordance with a power consumption level at the first wireless device or a thermal overhead level of the first wireless device; and
    communicating over the link with the second wireless device in the direction based at least in part on the selected first subset of antenna elements and the second subset of antenna elements.

2. The method of claim 1, wherein identifying the configuration of the one or more radio frequency components associated with the antenna array comprises:
    identifying a set of one or more power amplifiers at the first wireless device, wherein selecting the first subset of antenna elements for the uplink transmissions is based at least in part on the identified set of one or more power amplifiers; and
    identifying a set of one or more low-noise amplifiers at the first wireless device, wherein selecting the second subset of antenna elements for the downlink receptions is based at least in part on the identified set of one or more low-noise amplifiers.

3. The method of claim 2, wherein:
    a first power amplifier of the set of one or more power amplifiers is configured to operate with a first range of radio frequency spectrum bands;
    a second power amplifier of the set of one or more power amplifiers is configured to operate in a second range of radio frequency spectrum bands different from the first range; and
    a low-noise amplifier of the set of one or more low-noise amplifiers is configured to operate in a third range of radio frequency spectrum bands that comprises at least the first range and the second range.

4. The method of claim 1, further comprising:
    receiving, from the second wireless device, an indication of a quantity of antenna elements to use for communicating over the link based at least in part on antenna elements used at the second wireless device, wherein selecting the first subset of antenna elements and the second subset of antenna elements is based at least in part on the received indication.

5. The method of claim 1, wherein:
selecting the first subset of antenna elements and the second subset of antenna elements is based at least in part on an equivalent isotropic radiated power threshold, an effective isotropic sensitivity threshold, or a combination thereof.

6. The method of claim 1, wherein:
selecting the first subset of antenna elements and the second subset of antenna elements is based at least in part on a radio frequency spectrum bandwidth supported by each of the one or more radio frequency components.

7. The method of claim 1, wherein the first subset of antenna elements is different from the second subset of antenna elements.

8. The method of claim 1, wherein the configuration of the one or more radio frequency components comprises a quantity of power amplifiers and a quantity of low-noise amplifiers.

9. The method of claim 1, wherein the first wireless device comprises a user equipment, a customer premises equipment, a relay node, a smart repeater with a decode and forward capability, a dumb repeater with an amplify and forward capability, a router, an integrated access and backhaul node, or a combination thereof.

10. The method of claim 1, wherein the second wireless device comprises a base station, a backhaul node, an integrated access and backhaul node, or a combination thereof.

11. The method of claim 1, wherein the antenna array is configured to operate at carrier frequencies greater than 52.6 gigahertz.

12. A method for wireless communication at a first wireless device, comprising:
communicating over a link with a second wireless device;
receiving, from the second wireless device, an indication that a quantity of antenna elements used by the second wireless device has changed based at least in part on the second wireless device selecting a first subset of antenna elements for uplink transmissions and a second subset of antenna elements for downlink receptions such that a direction of communications over the link remains the same for a time period after the selection;
adjusting a transmission power, a transmission rate, or a combination thereof, based at least in part on the received indication that the quantity of antenna elements used by the second wireless device has changed; and
communicating over the link with the second wireless device in the direction and using the adjusted transmission power, the adjusted transmission rate, or a combination thereof, based at least in part on the received indication that the quantity of antenna elements used by the second wireless device has changed.

13. The method of claim 12, wherein the second wireless device comprises a user equipment, a customer premises equipment, a relay node, a smart repeater with a decode and forward capability, a dumb repeater with an amplify and forward capability, a router, an integrated access and backhaul node, or a combination thereof.

14. The method of claim 12, wherein the first wireless device comprises a base station, a backhaul node, an integrated access and backhaul node, or a combination thereof.

15. The method of claim 12, wherein the quantity of antenna elements are configured to operate at carrier frequencies greater than 52.6 gigahertz.

16. An apparatus for wireless communication at a first wireless device, comprising:
one or more processors,
one or more memories coupled with the one or more processors; and
one or more processor-readable instructions stored in the one or more memories and executable by the one or more processors to cause the apparatus to:
identify an antenna array comprising a plurality of antenna elements, the antenna array used for communicating over a link with a second wireless device;
identifying a first quantity of antenna elements from the plurality of antenna elements for communicating with the second wireless device during a first time interval;
select, from the plurality of antenna elements, a second quantity of antenna elements that is less than the first quantity of antenna elements at a second time interval, the second quantity of antenna elements comprising a first subset of antenna elements for uplink transmissions and a second subset of antenna elements for downlink receptions such that a direction of communications over the link remains the same for a time period after the selection, the selection being based at least in part on one or more operational parameters associated with power and link performance; and
communicate over the link with the second wireless device in the direction and using the selected first subset of antenna elements and the second subset of antenna elements.

17. The apparatus of claim 16, wherein the one or more processor-readable instructions are further executable by the one or more processors to cause the apparatus to:
transmit, to the second wireless device, an indication that a quantity of antenna elements used by the first wireless device has changed based at least in part on the selected first subset of antenna elements and the second subset of antenna elements.

18. The apparatus of claim 17, wherein the one or more processor-readable instructions are further executable by the one or more processors to cause the apparatus to:
receive, from the second wireless device, a transmission having an adjusted transmission power, adjusted transmission rate, or a combination thereof, based at least in part on the transmitted indication that the quantity of antenna elements used by the first wireless device has changed.

19. The apparatus of claim 16, wherein the one or more processor-readable instructions are further executable by the one or more processors to cause the apparatus to:
select a third quantity of antenna elements that is less than the second quantity of antenna elements; and
communicate over the link with the second wireless device during a third time interval using the third quantity of antenna elements.

20. The apparatus of claim 19, wherein the third quantity of antenna elements form a planar array pattern, a linear array pattern, or a combination thereof.

21. The apparatus of claim 16, wherein the first time interval and the second time interval each comprise one or more symbols, one or more slots, one or more subframes, or a combination thereof.

22. The apparatus of claim 16, wherein the one or more operational parameters comprise a power consumption level at the first wireless device, a thermal overhead level of the first wireless device, a communication rate threshold, a transmission reliability threshold, or a combination thereof.

23. The apparatus of claim 16, wherein the first wireless device comprises a user equipment, a customer premises equipment, a relay node, a smart repeater with a decode and forward capability, a dumb repeater with an amplify and forward capability, a router, an integrated access and backhaul node, or a combination thereof.

24. The apparatus of claim 16, wherein the second wireless device comprises a base station, a backhaul node, an integrated access and backhaul node, or a combination thereof.

25. The apparatus of claim 16, wherein the antenna array is configured to operate at carrier frequencies greater than 52.6 gigahertz.

26. An apparatus for wireless communication at a first wireless device, comprising:
- one or more processors,
- one or more memories coupled with the one or more processors; and
- one or more processor-readable instructions stored in the one or more memories and executable by the one or more processors to cause the apparatus to:
  - communicate over a link with a second wireless device;
  - receive, from the second wireless device, an indication that a quantity of antenna elements used by the second wireless device has changed based at least in part on the second wireless device selecting a first subset of antenna elements for uplink transmissions and a second subset of antenna elements for downlink receptions such that a direction of communications over the link remains the same for a time period after the selection;
  - adjust a transmission power, a transmission rate, or a combination thereof, based at least in part on the received indication that the quantity of antenna elements used by the second wireless device has changed; and
  - communicate over the link with the second wireless device in the direction and using the adjusted transmission power, the adjusted transmission rate, or a combination thereof, based at least in part on the received indication that the quantity of antenna elements used by the second wireless device has changed.

27. The apparatus of claim 26, wherein the second wireless device comprises a user equipment, a customer premises equipment, a relay node, a smart repeater with a decode and forward capability, a dumb repeater with an amplify and forward capability, a router, an integrated access and backhaul node, or a combination thereof.

28. The apparatus of claim 26, wherein the first wireless device comprises a base station, a backhaul node, an integrated access and backhaul node, or a combination thereof.

29. The apparatus of claim 26, wherein the quantity of antenna elements are configured to operate at carrier frequencies greater than 52.6 gigahertz.

* * * * *